US008963941B2

(12) United States Patent
Aragaki et al.

(10) Patent No.: US 8,963,941 B2
(45) Date of Patent: Feb. 24, 2015

(54) IMAGE DISPLAY APPARATUS AND IMAGE DISPLAY METHOD

(71) Applicant: Seiko Epson Corporation, Tokyo (JP)

(72) Inventors: Takumi Aragaki, Matsumoto (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/795,732

(22) Filed: Mar. 12, 2013

(65) Prior Publication Data

US 2013/0187945 A1 Jul. 25, 2013

Related U.S. Application Data

(63) Continuation of application No. 13/402,511, filed on Feb. 22, 2012, now Pat. No. 8,416,259, which is a continuation of application No. 12/268,207, filed on Nov. 10, 2008, now Pat. No. 8,144,168.

(30) Foreign Application Priority Data

Nov. 12, 2007 (JP) ................................. 2007-292873

(51) Int. Cl.
*G09G 5/00* (2006.01)
*G09G 5/02* (2006.01)
(Continued)

(52) U.S. Cl.
CPC ............ *G06T 5/006* (2013.01); *G02B 27/1046* (2013.01); *G02B 27/145* (2013.01);
(Continued)

(58) Field of Classification Search
USPC ................. 345/581, 589, 606, 690, 612–613, 345/547–549; 348/253–254, 553, 557, 560; 358/518–520, 525; 382/162, 167, 254, 382/274, 276, 305, 299–300; 353/46, 353/69–70
See application file for complete search history.

(56) References Cited

U.S. PATENT DOCUMENTS 6,411,290 B1    6/2002  Sasaki
6,480,242 B1   11/2002  Okada et al.
(Continued)

FOREIGN PATENT DOCUMENTS

CN     1250999 A       4/2000
JP     A-61-150487     7/1986
(Continued)

OTHER PUBLICATIONS

Nov. 28, 2011 Notice of Allowance issued in U.S. Appl. No. 12/508,194.
(Continued)

*Primary Examiner* — Wesner Sajous
(74) *Attorney, Agent, or Firm* — Oliff PLC

(57) ABSTRACT

An image display apparatus that displays an image on the basis of input image signals corresponding to sub-pixels forming one pixel includes a shift-amount storing unit that stores shift amounts of display positions of the sub-pixels relative to given reference positions in a display image, an image-signal correcting unit that corrects the input image signals according to the shift amounts, and an image display unit that displays an image on the basis of the image signals corrected by the image-signal correcting unit.

6 Claims, 21 Drawing Sheets

(51) Int. Cl.

| | |
|---|---|
| *G09G 5/10* | (2006.01) |
| *G09G 5/36* | (2006.01) |
| *H04N 5/202* | (2006.01) |
| *H04N 5/44* | (2011.01) |
| *H04N 5/46* | (2006.01) |
| *G03F 3/08* | (2006.01) |
| *H04N 1/46* | (2006.01) |
| *G06K 9/00* | (2006.01) |
| *G06K 9/40* | (2006.01) |
| *G06K 9/54* | (2006.01) |
| *G06T 5/00* | (2006.01) |
| *G02B 27/10* | (2006.01) |
| *G02B 27/14* | (2006.01) |
| *G02B 27/28* | (2006.01) |
| *G09G 3/00* | (2006.01) |
| *H04N 9/31* | (2006.01) |
| *G06K 9/32* | (2006.01) |
| *G06K 9/36* | (2006.01) |
| *G03B 21/00* | (2006.01) |
| *G03B 21/14* | (2006.01) |

(52) U.S. Cl.
CPC ............ *G02B27/149* (2013.01); *G02B 27/285* (2013.01); *G09G 3/002* (2013.01); *H04N 9/3185* (2013.01); *H04N 9/3194* (2013.01); *H04N 9/3197* (2013.01); *G09G 2320/02* (2013.01); *G09G 2340/10* (2013.01)
USPC ........... 345/581; 345/589; 345/606; 345/690; 345/613; 345/547; 348/254; 348/553; 348/557; 348/560; 358/518; 358/520; 358/525; 382/167; 382/274; 382/276; 382/300; 382/305; 353/46; 353/69

(56) References Cited

U.S. PATENT DOCUMENTS

| | | | | |
|---|---|---|---|---|
| 6,603,885 | B1 * | 8/2003 | Enomoto | 382/263 |
| 6,989,872 | B2 | 1/2006 | Nakatsuji et al. | |
| 7,025,431 | B2 * | 4/2006 | Ikeda et al. | 347/4 |
| 7,431,462 | B2 | 10/2008 | Inazumi et al. | |
| 7,456,846 | B1 | 11/2008 | King et al. | |
| 7,834,879 | B2 * | 11/2010 | Komooka et al. | 345/501 |
| 8,040,441 | B2 | 10/2011 | Nishida et al. | |
| 8,055,101 | B2 * | 11/2011 | Intwala | 382/299 |
| 8,103,087 | B2 * | 1/2012 | Maeda et al. | 382/149 |
| 8,144,168 | B2 * | 3/2012 | Aragaki et al. | 345/613 |
| 8,144,264 | B2 * | 3/2012 | Aragaki et al. | 348/745 |
| 8,248,434 | B2 * | 8/2012 | Aragaki et al. | 345/613 |
| 8,294,740 | B2 * | 10/2012 | Aragaki et al. | 345/694 |
| 8,297,760 | B2 * | 10/2012 | Aragaki et al. | 353/101 |
| 2003/0090597 | A1 | 5/2003 | Katoh et al. | |
| 2006/0023197 | A1 * | 2/2006 | Joel | 355/77 |
| 2006/0158545 | A1 | 7/2006 | Hirai | |
| 2007/0064995 | A1 | 3/2007 | Oaki et al. | |
| 2007/0082742 | A1 * | 4/2007 | Takizawa et al. | 463/43 |
| 2007/0165942 | A1 * | 7/2007 | Jin et al. | 382/154 |
| 2008/0031610 | A1 * | 2/2008 | Border et al. | 396/89 |
| 2008/0094419 | A1 | 4/2008 | Leigh et al. | |
| 2008/0278572 | A1 * | 11/2008 | Gharib et al. | 348/49 |
| 2009/0027567 | A1 | 1/2009 | Nishimura et al. | |
| 2009/0027568 | A1 | 1/2009 | Nishimura et al. | |
| 2009/0027569 | A1 | 1/2009 | Nishimura et al. | |
| 2009/0066723 | A1 * | 3/2009 | Saito | 345/629 |
| 2009/0096903 | A1 | 4/2009 | Kusaka | |
| 2009/0244088 | A1 * | 10/2009 | Aragaki et al. | 345/613 |
| 2009/0245619 | A1 * | 10/2009 | Oaki et al. | 382/144 |
| 2010/0033405 | A1 | 2/2010 | Aragaki et al. | |
| 2010/0061215 | A1 | 3/2010 | Sakaguchi et al. | |
| 2011/0109749 | A1 * | 5/2011 | Chanas et al. | 348/164 |
| 2012/0147276 | A1 | 6/2012 | Nishimura et al. | |

FOREIGN PATENT DOCUMENTS

| | | |
|---|---|---|
| JP | A-07-264615 | 10/1995 |
| JP | A-2001-076132 | 3/2001 |
| JP | A-2003-083907 | 3/2003 |
| JP | A-2003-167530 | 6/2003 |
| JP | A-2005-121978 | 5/2005 |
| JP | A-2006-174184 | 6/2006 |
| JP | A-2007-300461 | 11/2007 |
| JP | A-2008-147725 | 6/2008 |
| JP | A-2009-014747 | 1/2009 |
| JP | A-2009-031441 | 2/2009 |
| JP | A-2009-031442 | 2/2009 |
| JP | A-2009-031443 | 2/2009 |
| JP | A-2009-033364 | 2/2009 |
| JP | A-2009-033365 | 2/2009 |
| WO | WO 2005-117456 A | 12/2005 |

OTHER PUBLICATIONS http://www.projectcentral.corn/Sony-VPL-VW60.htm accessed on Nov. 8, 2012.

Apr. 5, 2012 Office Action in in U.S. Appl. No. 13/402,511.

Dec. 10, 2012 Notice of Allowance in U.S. Appl. No. 13/402,511.

* cited by examiner

IMAGE DISPLAY APPARATUS AND IMAGE DISPLAY METHOD

CROSS-REFERENCE TO RELATED APPLICATIONS

This is a Continuation of U.S. patent application Ser. No. 13/402,511 filed Feb. 22, 2012, which is a Continuation of U.S. patent application Ser. No. 12/268,207 filed Nov. 10, 2008, and claims priority to JP 2007-292873 filed in Japan on Nov. 12, 2007. The disclosures of the prior applications are hereby incorporated by reference herein in its entirety.

BACKGROUND

1. Technical Field

The present invention relates to an image display apparatus and an image display method.

2. Related Art

In recent years, high-performance image display apparatuses such as a large screen television and a projector are widely spread. In these image display apparatuses, improvement of an image quality of a display image is becoming more important. In particular, concerning a projector useful as an image display apparatus that has a high degree of freedom of installation and can easily adjust a size of a display image with a so-called zoom function, there is an increasing demand for further improvement of an image quality because of improvement of an image quality of contents displayed on the projector.

Concerning such a projector, JP-A-61-150487 discloses a projector in which a transmissive matrix liquid crystal display device is used as a light valve. The projector includes plural dichroic mirrors, separates light from a light source into three primary colors of R, G, and B with the plural dichroic mirrors, transmits the lights of the respective colors through the liquid crystal display device, and, then, projects the lights on a screen via a projection lens. When the lights are transmitted through the liquid crystal display device, the transmitted lights of the liquid crystal display device are combined by optical means such as a mirror such that two-dimensional pixel arrangements coincide with each other.

In the projector of this type, for example, the number of pixels of the matrix liquid crystal display device is increased to perform light modulation based on an image signal corresponding to content and display an image. This makes it possible to realize improvement of an image quality of a display image.

However, when the number of pixels of an image displayed by the projector is increased, positional adjustment for each of the pixels by an optical system tends to be more difficult. For example, the projection lens included in the projector has chromatic aberration and a refractive index of the projection lens is different depending on wavelength. Therefore, aberration accuracy of the optical system of the projector is required to be higher than that in the past. However, it is difficult to accurately adjust all display positions of sub-pixels forming one pixel.

Shifts of the display positions of such sub-pixels are negligible when the number of display pixels is small. However, according to an increase in the number of display pixels, the shifts of the display positions of the sub-pixels become conspicuous and cause deterioration in an image quality.

SUMMARY

An advantage of some aspects of the invention is to provide an image display apparatus and an image display method that can prevent deterioration in an image quality due to shifts of display positions of sub-pixels forming one pixel.

According to an aspect of the invention, there is provided an image display apparatus that displays an image on the basis of input image signals corresponding to sub-pixels forming one pixel, the image display apparatus including a shift-amount storing unit that stores shift amounts of display positions of the sub-pixels relative to given reference positions in a display image, an image-signal correcting unit that corrects the input image signals according to the shift amounts, and an image display unit that displays an image on the basis of the image signals corrected by the image-signal correcting unit.

According to the aspect of the invention, the shift amounts of the display positions of the sub-pixels forming one pixel are stored, shift amounts of all the sub-pixels in an image are calculated, and the input image signals of the sub-pixels are corrected according to the shift amounts. Therefore, it is possible to provide an image display apparatus that can prevent deterioration in an image quality due to shifts of the display positions of the sub-pixels forming one pixel.

In the image display apparatus according to the aspect of the invention, when one pixel is formed by sub-pixels of plural color components, the reference positions may be display positions of sub-pixels of any one color component among the sub-pixels of the plural color components.

According to the aspect of the invention, the display positions of the sub-pixels of any one color component among the sub-pixels of the plural color components forming one pixel are set as the reference positions and shift amounts of display positions of the sub-pixels of the other color components are calculated. Therefore, calculation of shift amounts of all the sub-pixels of the color component in the reference positions and correction processing for input image signals of the color component in the reference positions do not have to be performed. It is possible to provide an image display apparatus that prevents deterioration in an image quality due to shifts of display positions of sub-pixels forming one pixel and realize simplification of processing.

In the image display apparatus according to the aspect of the invention, the shift-amount storing unit can store shift amounts of display positions of one or plural sampling sub-pixels in the display image. The image-signal correcting unit can calculate, for each of sub-pixels forming each of pixels of the display image, shift amounts of a display position of the sub-pixel using the shift amounts of the display positions of the sampling sub-pixels, and correct an input image signal of the sub-pixel according to the shift amounts.

According to the aspect of the invention, shift amounts of each of the sub-pixels only have to be calculated by interpolation processing. Therefore, it is possible to provide, at low cost, an image display apparatus that can reduce a storage capacity for the shift amounts and prevent deterioration in an image quality due to shifts of display positions of sub-pixels forming one pixel.

The image display apparatus according to the aspect of the invention further includes an image-signal-correction control unit that controls, on the basis of a given correction control signal, correction processing for the input image signals by the image-signal correcting unit. The image-signal-correction control unit may vary a method of the correction processing for the input image signals by the image-signal correcting unit according to the correction control signal.

According to the aspect of the invention, it is possible to more accurately perform the correction processing for the input image signals corresponding to shift amounts of display positions of sub-pixels.

The image display apparatus according to the aspect of the invention further includes a noon-state detecting unit that detects a zoom state of an image displayed by the image display unit. The image-signal-correction control unit can cause the image-signal correcting unit to perform the correction processing for the input image signals or can omit the correction processing according to the correction control signal corresponding to a result of the detection by the zoom-state detecting unit.

According to the aspect of the invention, it is possible to avoid display positions of sub-pixels from shifting according to a zoom state and suppress deterioration in an image quality of an image display apparatus having a zoom function.

In the image display apparatus according to the aspect of the invention, the shift-amount storing unit can store shift amount groups of display positions of plural sets of the sub-pixels. The image-signal correcting unit can correct the input image signals using a shift amount group of the display positions of the sub-pixels of a set corresponding to the correction control signal among the shift amount groups of the display positions of the plural sets of the sub-pixels stored in the shift-amount storing unit.

According to the aspect of the invention, the shift-amount storing unit can store the shift amount groups of the display positions of the plural sets of the sub-pixels and the image-signal correcting unit can correct the input image signals using the shift amount group of the display positions of the sub-pixels of the set corresponding to the correction control signal among the shift amount groups of the display positions of the plural sets of the sub-pixels stored in the shift-amount storing unit. This makes it possible to apply more accurate correction processing to the input image signals.

The image display apparatus according to the aspect of the invention further includes a sub-pixel-position measuring unit that measures display positions of sub-pixels in an image displayed by the image display unit. The shift-amount storing unit can store, using a result of the measurement by the sub-pixel-position measuring unit, shift amounts corresponding to the display positions of the sub-pixels relative to the reference position.

According to the aspect of the invention, the image display apparatus includes the sub-pixel-position measuring unit and calculates shift amounts of display positions of sub-pixels using a result of the measurement by the sub-pixel-position measuring unit. This makes it possible to prevent deterioration in an image quality even if there is an individual difference (manufacturing fluctuation) of an image display apparatus in shifts of display positions of sub-pixels.

According to another aspect of the invention, there is provided an image display method of displaying an image on the basis of input image signals corresponding to sub-pixels forming one pixel, the image display method including storing shift amounts of display positions of the sub-pixels relative to given reference positions in a display image, correcting the input image signals according to the shift amounts, and displaying an image using light modulated on the basis of the image signals corrected in correcting the input image signals.

According to the aspect of the invention, the shift amounts of the display positions of the sub-pixels forming one pixel are stored, shift amounts of all the sub-pixels in an image are calculated, and the input image signals of the sub-pixels are corrected according to the shift amounts. Therefore, it is possible to provide an image display method that can prevent deterioration in an image quality due to shifts of the display positions of the sub-pixels forming one pixel.

BRIEF DESCRIPTION OF THE DRAWINGS

The invention will be described with reference to the accompanying drawings, wherein like numbers reference like elements.

DETAILED DESCRIPTION OF EMBODIMENTS

Embodiments of the invention are explained in detail below with reference to the accompanying drawings. The embodiments explained below do not unreasonably limit content of the invention described in claims. All configurations explained below are not always essential elements of the invention.

A projector is explained below as an example of an image display apparatus according to the embodiments of the invention. However, the image display apparatus according to the embodiments is not limited to the projector. Deterioration in an image quality due to shifts of display positions of sub-pixels is considered to be a phenomenon that can occur not only in the projector but also in various image display apparatuses. Therefore, the image display apparatus according to the embodiments is not limited to the projector.

First Embodiment

Figure 1:
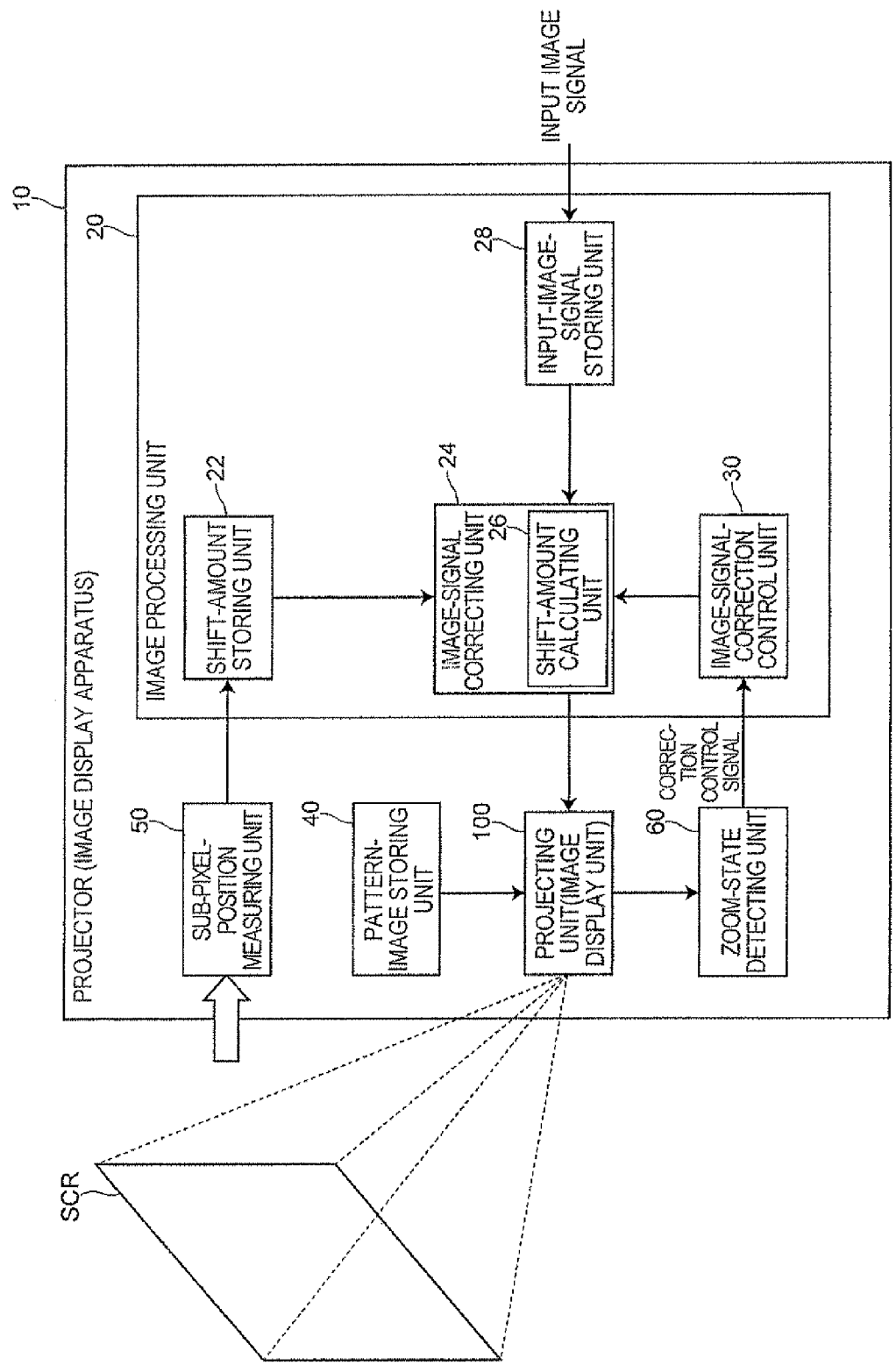
FIG. 1 is a block diagram of a configuration example of a projector as an image display apparatus according to a first embodiment of the invention.

A block diagram of a configuration example of a projector as an image display apparatus according to a first embodiment of the invention is shown in FIG. 1.

A projector 10 according to the first embodiment displays an image by projecting, on a screen SCR, light modulated on the basis of image signals of plural sub-pixels forming one pixel. Such a projector 10 includes an image processing unit 20, a pattern-image storing unit 40, a sub-pixel-position measuring unit 50, a zoom-state detecting unit 60, and a projecting unit 100 as an image display unit.

The image processing unit 20 applies correction processing corresponding to shift amounts of sub-pixels forming each of pixels of an image projected on the screen SCR to an input image signal for each of the sub-pixels from a not-shown image-signal generating apparatus. The shift amounts of the sub-pixels are calculated from a measurement result of the sub-pixel-position measuring unit 50. The pattern-image storing unit 40 stores a pattern image for measuring positions of sub-pixels of a projected image (a display image) on the screen SCR. The sub-pixel-position measuring unit 50 includes an imaging device such as a digital still camera. The sub-pixel-position measuring unit 50 images an image projected on the screen SCR by the projecting unit 100 using the pattern image stored in the pattern-image storing unit 40 and measures positions of sub-pixels forming each of pixels using data of this imaging as image information. The positions of the sub-pixels measured by the sub-pixel-position measuring unit 50 are used for calculation of shift amounts relative to given reference positions in the projected image on the screen SCR by the image processing unit 20.

The image processing unit 20 can include a shift-amount storing unit 22, an image-signal correcting unit 24, an input-image-signal storing unit 28, and an image-signal-correction control unit 30. Shift amounts (in a broader sense, correction parameters) of the positions of the sub-pixels measured by the sub-pixel-position measuring unit 50 are stored in the shift-amount storing unit 22 relatively to the given reference positions in the projected image (the display image) on the screen SCR.

In the first embodiment, the shift-amount storing unit 22 stores only shift amounts of display positions of one or plural sampling sub-pixels in the projected image on the screen SCR and the image-signal correcting unit 24 calculates shift amounts of all sub-pixels in the image with interpolation processing using the shift amounts. Therefore, the image-signal correcting unit 24 can include the shift-amount calculating unit 26. The shift-amount calculating unit 26 calculates shift amounts of all sub-pixels in the image with interpolation processing using the shift amounts stored in the shift-amount storing unit 22 for each of sub-pixels.

The sampling sub-pixels mean sampled one or plural sub-pixels among plural sub-pixels forming each of pixels in an image. As such sampling sub-pixels, sub-pixels in positions discontinuous to one another are desirable. Consequently, since shift amounts of the sub-pixels are calculated by the interpolation processing, it is possible to reduce a storage capacity for the shift amounts.

The input-image-signal storing unit 28 stores input image signals from the not-shown image-signal generating apparatus. The image-signal correcting unit 24 corrects, according to the shift amounts of the sub-pixels, the input image signals of the sub-pixels stored in the input-image-signal storing unit 28.

Shift amounts calculated for all sub-pixels in the projected image on the screen SCR in advance may be stored in the shift-amount storing unit 22. In this case, the image-signal correcting unit 24 only has to correct the input image signals using the shift amounts read out from the shift-amount storing unit 22 without calculating shift amounts for each of the sub-pixels with the interpolation processing.

Image signals from the image-signal correcting unit 24 are inputted to the projecting unit 100. The projecting unit 100 includes, for example, a 3CCD liquid crystal projector and projects an image on the screen SCR using light modulated on the basis of image signals of sub-pixels forming one pixel. The projecting unit 100 has a so-called zoom function and can project an image of a size corresponding to zoom magnification on the screen SCR. The zoom-state detecting unit 60 can detect zoom magnification of the projecting unit 100 as a zoom state.

In short, the projector 10 shown in FIG. 1 is an image display apparatus that displays an image on the basis of input image signals corresponding to sub-pixels forming one pixel. The projector 10 can include the shift-amount storing unit 22 that stores shift amounts of display positions of the sub-pixels relative to given reference positions in a display image, the image-signal correcting unit 24 that corrects the input image signals according to the shift amounts, and the projecting unit 100 as the image display unit that displays an image using light modulated on the basis of the image signals corrected by the image-signal correcting unit 24. Alternatively, an image display method of displaying an image on the basis of input image signals corresponding to sub-pixels forming one pixel can include storing shift amounts of display positions of the sub-pixels relative to given reference positions in a display image, correcting the input image signals according to the shift amounts, and displaying an image using light modulated on the basis of the image signals corrected in correcting the input image signals.

Moreover, the shift-amount storing unit 22 can store shift amounts of display positions of one or plural sampling sub-pixels in a display image. The image-signal correcting unit 24 can calculate shift amounts of display positions of the sub-pixels using the shift amounts of the display positions of the sampling sub-pixels for each of sub-pixels configuring each pixel of the display image and correct input image signals of the sub pixels according to the shift amounts.

The image-signal-correction control unit 30 can control correction processing for the input image signals by the image-signal correcting unit 24 on the basis of a given correction control signal and vary the correction processing for the input image signals by the image-signal correcting unit 24 according to a correction control signal. In the first embodiment, a correction control signal corresponding to a detection result of the zoom-state detecting unit 60 is inputted to the image-signal-correction control unit 30. The image-signal correcting unit 24 can vary a correction processing (method) for the input image signals by performing the correction processing for the input image signals or omitting the correction processing according to the correction control signal. For example, the image-signal correcting unit 24 omits the correction processing for the input image signals when a zoom state is a maximum telephoto state (tele end) and performs the correction processing for the input image signals in the other zoom states. Alternatively, the image-signal correcting unit 24 omits the correction processing for the input image signals, for example, when a zoom state is a minimum telephoto state (wide) and performs the correction processing for the input image signals in the other zoom states. Consequently, in some case, the input image signals can be more accurately corrected according to shift amounts of display positions of sub-pixels.

The zoom function of the projector is an extremely useful function in that a size of a projected image can be changed. However, when a zoom state is changed, a state of chromatic aberration of a projection lens is also changed and display positions of sub-pixels forming one pixel shift for each of the sub-pixels. Therefore, when the zoom state is changed, input image signals are corrected according to the shift amounts of the display positions of the sub-pixels forming one pixel. This makes it possible to prevent deterioration in an image quality due to shifts of the display positions of the sub-pixels forming one pixel caused according to the zoom state.

Figure 2:
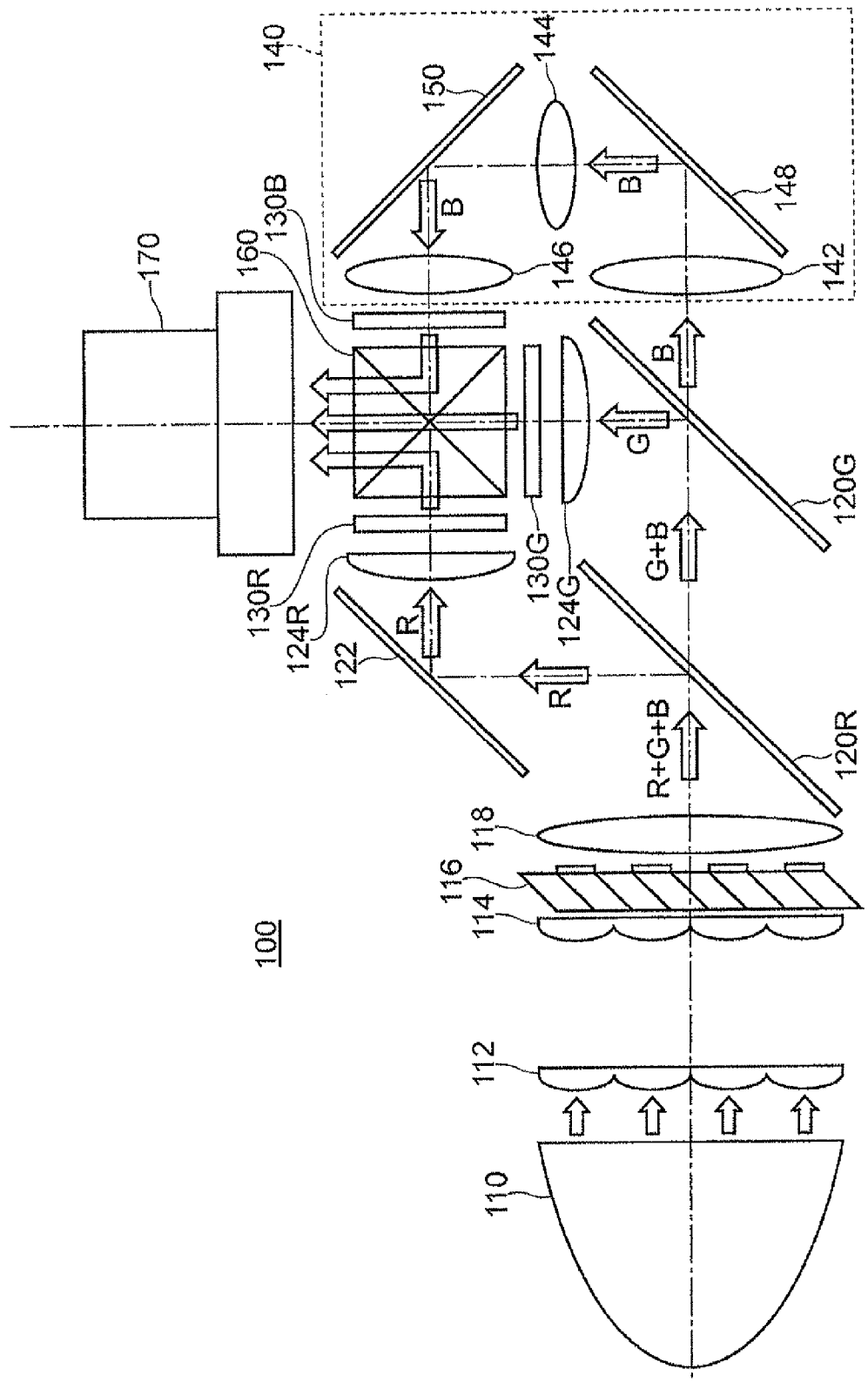
FIG. 2 is a diagram of a configuration example of a projecting unit shown in FIG. 1.

FIG. 2 is a diagram of a configuration example of the projecting unit 100 shown in FIG. 1. In FIG. 2, the projecting unit 100 according to the first embodiment includes a so-called 3CCD liquid crystal projector. However, a projecting unit of the image display unit according to this embodiment is not limited to a projecting unit including the 3CCD liquid crystal projector.

The projecting unit 100 includes a light source 110, integrator lenses 112 and 114, a polarization conversion element 116, a superimposing lens 118, a dichroic mirror for R 120R, a dichroic mirror for G 120O, a reflection mirror 122, a field lens for R 124R, a field lens for G 124G, a liquid crystal panel for R 130R (a first light modulating unit), a liquid crystal panel for G 130G (a second light modulating unit), a liquid crystal panel for B 130B (a third light modulating unit), a relay optical system 140, a cross dichroic prism 160, and a projection lens 170. Liquid crystal panels used as the liquid crystal panel for R 130R, the liquid crystal panel for G 130O, and the liquid crystal panel for B 130E are transmissive liquid crystal display devices. The relay optical system 140 includes relay lenses 142, 144, and 146 and reflection mirrors 148 and 150.

The light source 110 includes, for example, an ultrahigh pressure mercury lamp and emits light including at least light of an R component, light of a G component, and light of a B component. The integrator lens 112 has plural small lenses for dividing the light from the light source 110 into plural partial lights. The integrator lens 114 has plural small lenses corresponding to the plural small lenses of the integrator lens 112. The superimposing lens 118 superimposes the partial lights emitted from the plural small lenses of the integrator lens 112.

The polarization converting element 116 has a polarizing beam splitter and a λ/2 plate. The polarization converting element 116 transmits a p polarized light, reflects an s polarized light, and converts the p polarized light into the s polarized light. The s polarized light from the polarization converting element 116 is irradiated on the superimposing lens 118.

The light superimposed by the superimposing lens 118 is made incident on the dichroic mirror for R 120R. The dichroic mirror for R 120R has a function of reflecting the light of the R components and transmitting the lights of the G component and the B component. The lights transmitted through the dichroic mirror for R 120R are irradiated on the dichroic mirror for G 120G. The light reflected by the dichroic mirror for R 120R is reflected by the reflection mirror 122 and guided to the field lens for R 124R.

The dichroic mirror for G 120G has a function of reflecting the light of the G component and transmitting the light of the B component. The light transmitted through the dichroic mirror for G 120G is made incident on the relay optical system 140. The light reflected by the dichroic mirror for G 120G is guided to the field lens for G 124G.

In order to reduce a difference between the optical path length of the light of the B component transmitted through the dichroic mirror for G 120G and the optical path length of the lights of the R component and the G component as much as possible, the relay optical system 140 corrects the difference between the optical path lengths using the relay lenses 142, 144, and 146. The light transmitted through the relay lens 142 is guided to the relay lens 144 by the reflection mirror 148. The light transmitted through the relay lens 144 is guided to the relay lens 146 by the reflection mirror 150. The light transmitted through the relay lens 146 is irradiated on the liquid crystal panel for B 130B.

The light irradiated on the field lens for R 124R is converted into parallel rays and made incident on the liquid crystal panel for R 130R. The liquid crystal panel for R 130R functions as a light modulating element (a light modulating unit) such that transmittance (passing rate or percentage modulation) changes on the basis of an image signal for R. Therefore, the light (light of a first color component) made incident on the liquid crystal panel for R 130R is modulated on the basis of the image signal for R. The light after the modulation is made incident on the cross dichroic prism 160.

The light irradiated on the field lens for G 124G is converted into parallel rays and made incident on the liquid crystal panel for G 130G. The liquid crystal panel for G 130G functions as a light modulating element (a light modulating unit) such that transmittance (passing rate or percentage modulation) changes on the basis of an image signal for G. Therefore, the light (light of a second color component) made incident on the liquid crystal panel for G 130G is modulated on the basis of the image signal for G. The light after the modulation is made incident on the cross dichroic prism 160.

The liquid crystal panel for B 130B on which the lights converted into parallel rays by the relay lenses 142, 144, and 146 are irradiated functions as a light modulating element (a light modulating unit) such that transmittance (passing rate or percentage modulation) changes on the basis of an image signal for B (an image signal of a sub-pixel of the first color component). Therefore, the light (light of a third color component) made incident on the liquid crystal panel for B 130B is modulated on the basis of the image signal for B. The light after the modulation is made incident on the cross dichroic prism 160.

The liquid crystal panel for R 130R, the liquid crystal panel for G 130G, and the liquid crystal panel for B 130B have the same configuration. Each of the liquid crystal panels is obtained by enclosing and filling liquid crystal as an electro-optic substance between a pair of transparent glass substrates. The liquid crystal panel modulates the passing rate of each of color lights according to an image signal of each of the sub-pixels using, for example, a polysilicon thin-film transistor as a switching element.

The cross dichroic prism 160 has a function of outputting, as emission light, combined light obtained by combining the incident lights from the liquid crystal panel for R 130R, the liquid crystal panel for G 130G, and the liquid crystal panel for B 130B. The projection lens 170 is a lens for expanding and focusing an output image on the screen SCR and has a function of expanding or reducing an image according to zoom magnification.

In the projector 10 according to the first embodiment having the configuration described above, first, processing for acquiring shift amounts of sub-pixels is performed. This acquisition processing is performed in, for example, an inspection process during manufacturing of the projector 10.

In this way, the sub-pixel-position measuring unit 50 is provided, sub-pixels projected by the projector 10 are imaged, and shift amounts of display positions of the sub-pixels are calculated. This makes it possible to prevent deterioration in an image quality even if there is an individual difference of a projector in shifts of display positions of sub-pixels.

Figure 3:
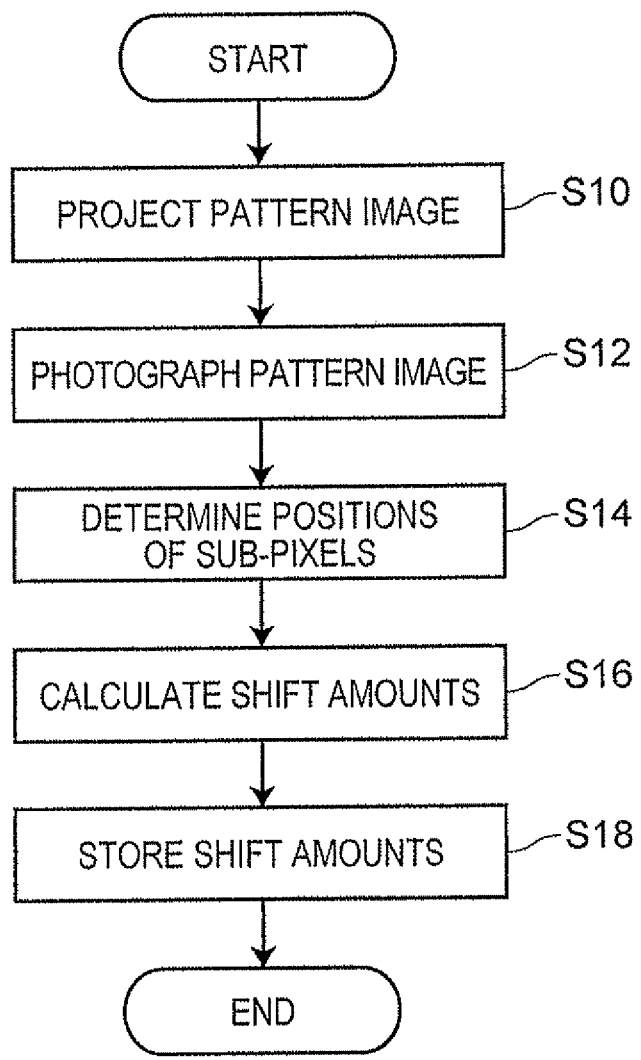
FIG. 3 is a flowchart of an example of processing for acquiring shift amounts of sub-pixels according to the first embodiment.

FIG. 3 is a flowchart of an example of processing for acquiring shift amounts of sub-pixels according to the first embodiment.

First, in the projector 10, image information corresponding to the pattern image stored in the pattern-image storing unit 40 is read out. The projecting unit 100 projects the pattern image on the screen SCR (step S10). After the pattern image is projected, the sub-pixel-position measuring unit 50 photographs the projected image on the screen SCR (step S12). The sub-pixel-position measuring unit 50 can photograph the projected image with the number of imaging pixels larger than the number of pixels of the projected image on the screen SCR. In other words, the sub-pixel-position measuring unit 50 photographs, with the number of imaging pixels larger than one pixel, a display pixel for one pixel of the projected image on the screen SCR and captures the display pixel.

Subsequently, the sub-pixel-position measuring unit 50 determines display positions of sub-pixels (step S14). The sub-pixel-position measuring unit 50 or the image processing unit 20 calculates shift amounts of sampling sub-pixels determined in step S14 relatively to given reference positions in the projected image, stores the shift amounts in the shift-amount storing unit 22 (step S18), and finishes a series of processing (end).

Figure 4:
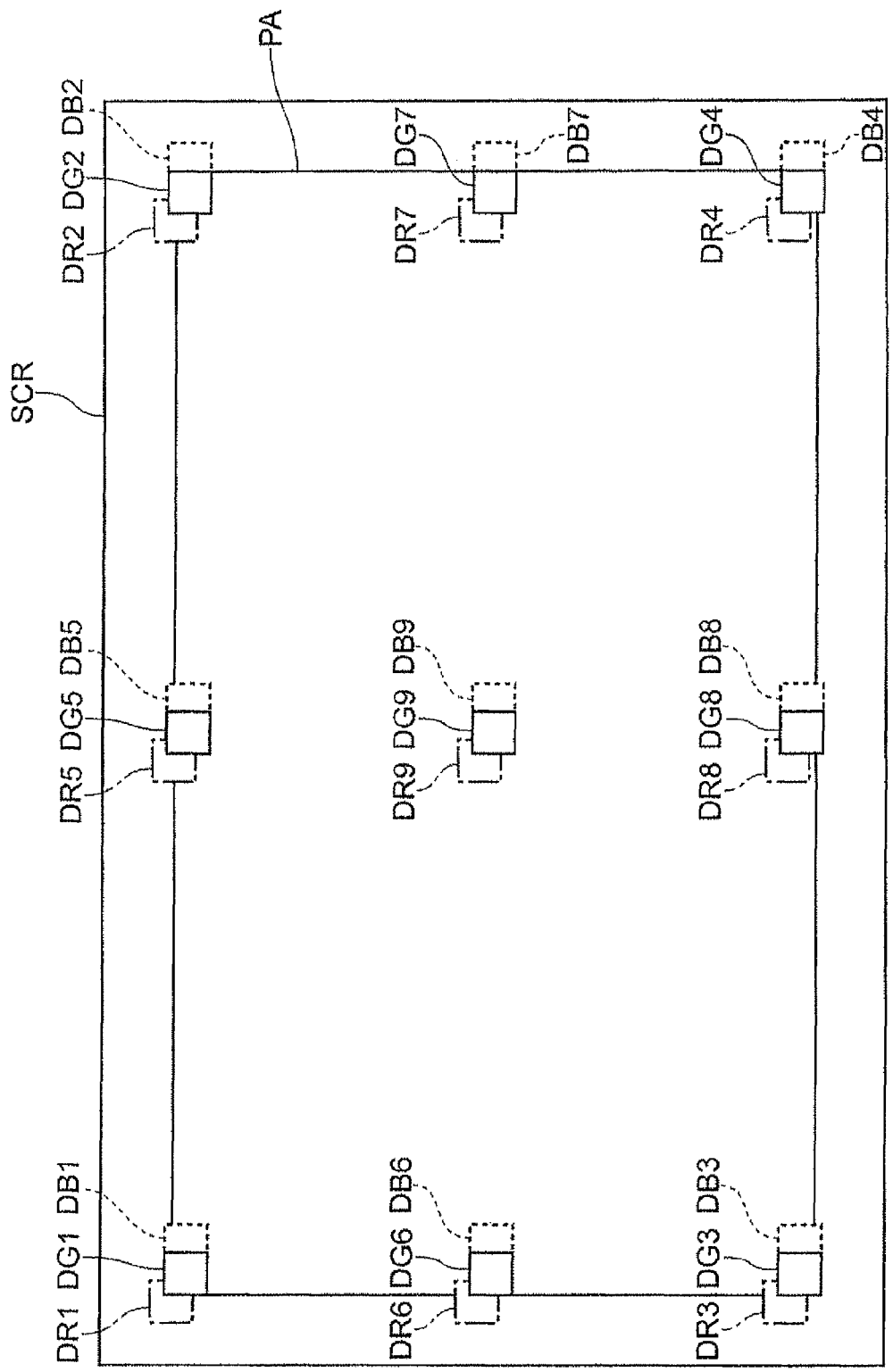
FIG. 4 is a diagram of an example of a pattern image according to the first embodiment.

An example of the pattern image according to the first embodiment is shown in FIG. 4. In step S10 shown in FIG. 3, for example, the pattern image shown in FIG. 4 is projected on the screen SCR.

In the example shown in FIG. 4, shifts of a display position occur for each of sub-pixels when the pattern image according to the first embodiment is projected on the screen SCR. Originally, an optical system of the projector 10 is adjusted such that display positions of sub-pixels forming one pixel coincide with one another. However, it is difficult to cause the display positions of the sub-pixels forming one pixel to completely coincide with one another because of aberration and the like of the optical system.

This pattern image has nine sampling sub-pixels in a boundary portion of a projection area PA on the screen SCR. The sampling sub-pixels include four pixels near four corners of the rectangular projection area PA, four pixels, each located in the middle between two of the sampling pixels near the four corners, and one pixel located near the center of the projection area PA. Each of the sampling sub-pixels has a sampling sub-pixel of an R component, a sampling sub-pixel of a G component, and a sampling sub-pixel of a B component. A display pixel of each of the sub-pixels is schematically shown in a rectangular shape. However, actually, a shape of the display pixel is not rectangular because of distortion and the like of a lens.

Figure 5:
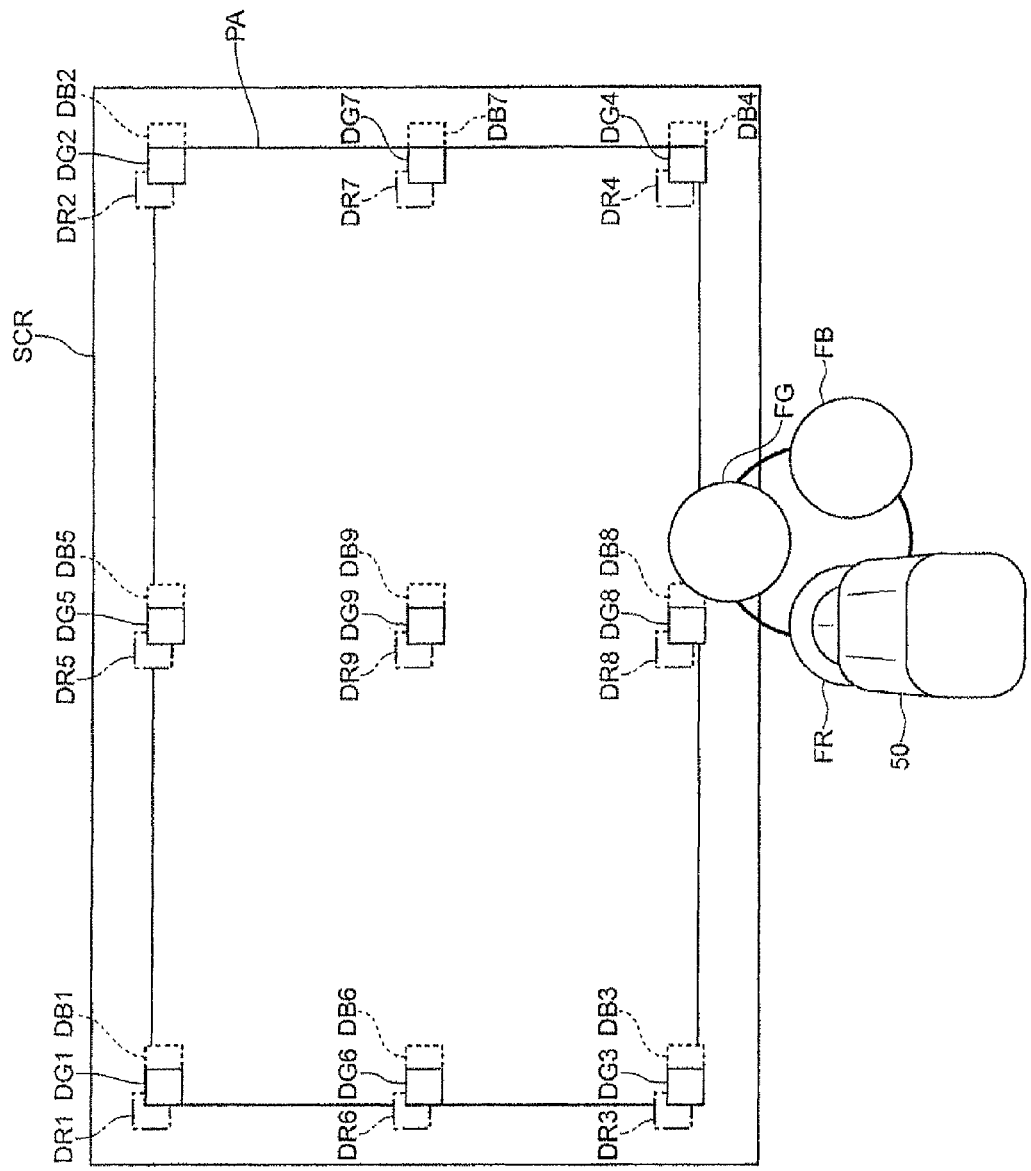
FIG. 5 is a diagram for explaining processing for imaging a pattern image according to the first embodiment.

FIG. 5 is a diagram for explaining processing for imaging the pattern image according to the first embodiment. In FIG. 5, components same as those shown in FIG. 4 are denoted by the same reference signs and explanation of the components is omitted as appropriate.

In step S12 shown in FIG. 3, all the sub-pixels forming one pixel are projected at a time and the sub-pixel-position measuring unit 50 images the projected image on the screen SCR via the color filter FR of the R component. This makes it possible to capture only display pixels of the sub-pixels of the R component. Similarly, the sub-pixel-position measuring unit 50 images the projected image on the screen SCR via the color filter FG of the G component and, then, images the projected image on the screen SCR via the color filter FB of the B component. This makes it possible to capture display pixels of the sub-pixels of the G component and display pixels of the sub-pixels of the B component in order.

A method of capturing the display images of the sub-pixels is not limited to the method explained with reference to FIG. 5. For example, the display of sub-pixels and the imaging of display pixels of the sub-pixels without the intervention of a color filter may be repeated for each of the color components.

Figure 6A:
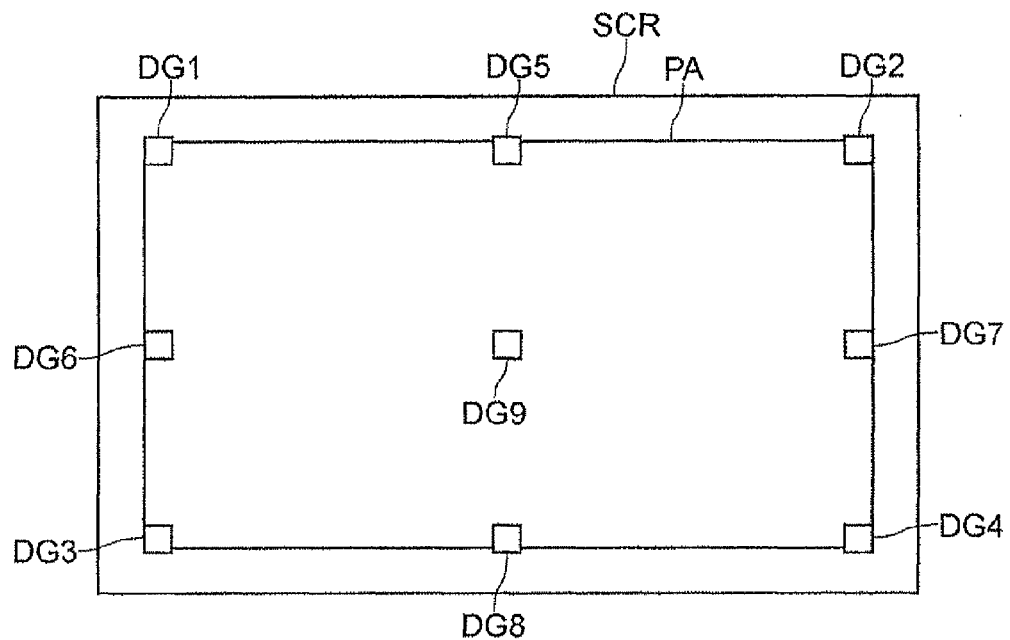
FIGS. 6A and 6B are diagrams for explaining processing for determining positions of sub-pixels of a G component and processing for calculating shift amounts of the sub-pixels.
Figure 6B:
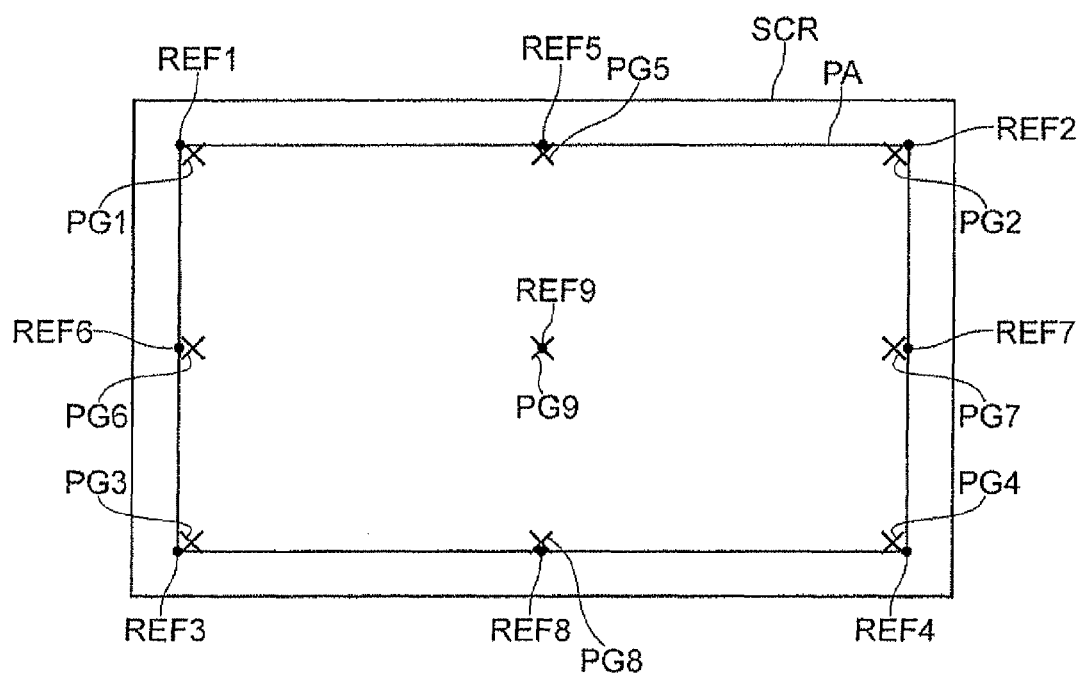

FIGS. 6A and 6B are diagrams for explaining processing for determining positions of sub-pixels of the G component and processing for calculating shift amounts of the sub-pixels. In FIGS. 6A and 6B, components same as those shown in FIG. 4 are denoted by the same reference signs and explanation of the components is omitted as appropriate.

Figure 7:
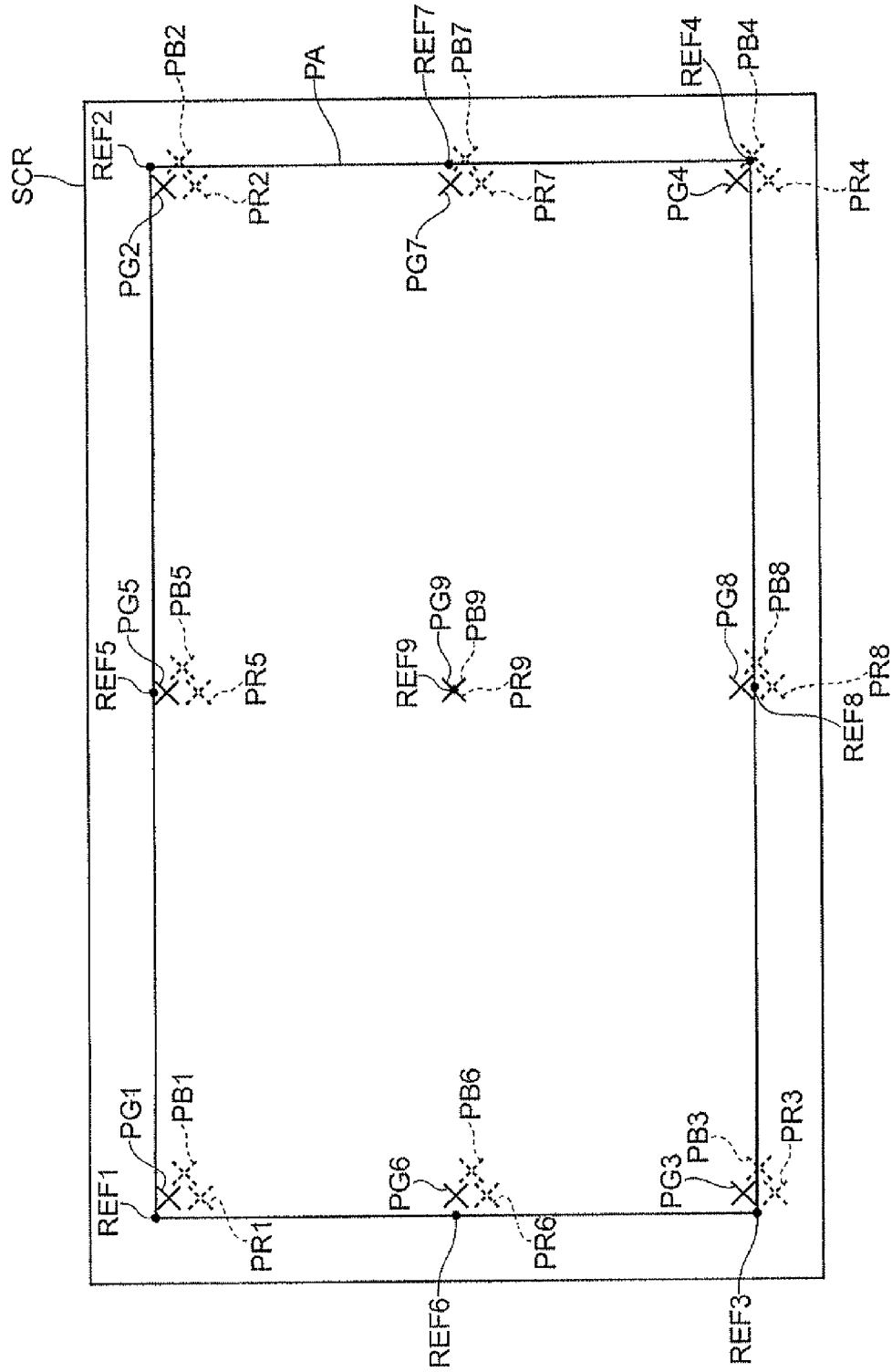
FIG. 7 is a diagram for explaining shift amounts according to the first embodiment.

FIG. 7 is a diagram for explaining shift amounts according to the first embodiment. In FIG. 7, components same as those shown in FIGS. 4 and 6B are denoted by the same reference signs and explanation of the components is omitted as appropriate.

In step S12 shown in FIG. 3, the sub-pixel-position measuring unit 50 or the image processing unit 20 acquires imaging data of display pixels DG1 to DG9 of sub-pixels of the G component shown in FIG. 6A according to the imaging by the sub-pixel-position measuring unit 50. Thereafter, in step S14 shown in FIG. 3, the sub-pixel-position measuring unit 50 or the image processing unit 20 determines a sub-pixel position of the G component out of an area of each of the display pixels DG1 to DG9 of the sub-pixels of the G component. More specifically, the area of each of the display pixels has plural imaging pixels and one imaging pixel is determined as a sub-pixel position of the G component from the area.

As this determination processing, it is possible to determine a pixel having a maximum pixel value as a sub-pixel position. For example, it is possible to calculate a luminance histogram of the area of each of the display pixels and specify a pixel having maximum luminance as a pixel having a largest pixel value. Alternatively, it is possible to calculate a luminance histogram of the area of each of the display pixels and determine a center-of-gravity position of pixels having luminance equal to or larger than a predetermined threshold as a sub-pixel position. As a result, as shown in FIG. 6B, sub-pixel positions PG1 to PG9 corresponding to the display pixels DG1 to DG9 of the sub-pixels shown in FIG. 6A are determined.

In FIG. 6B, it is assumed that reference positions REF1 to REF4 are determined in advance at four corners of the projection area PA on the screen SCR. Further, a reference position REF 5 is determined in an intermediate position between the reference positions REF1 and REF2, a reference position REF6 is determined in an intermediate position between the reference positions REF1 and REF3, a reference position REF1 is determined in an intermediate position between the reference positions REF2 and REF4, a reference position REF8 is determined in an intermediate position between the reference positions REF3 and REF4, and a reference position REF9 is determined in a center position of the projection area PA.

Similarly, concerning the R component and the B component, sub-pixel positions corresponding to display pixels DR1 to DR9 and DB1 to DB9 of sub-pixels are determined. As a result, sub-pixel positions of sampling pixels of the R component, the G component, and the B component are determined as shown in FIG. 7.

In step S16 shown in FIG. 3, the sub-pixel-position measuring unit 50 or the image processing unit 20 calculates, for example, as shown in FIG. 7, shift amounts (a shift amount in the horizontal direction of the projected image and a shift amount in the vertical direction of the projected image) of a sub-pixel position PR1 of the R component, shift amounts of a sub-pixel position PG1 of the G component, and shift amounts of a sub-pixel position PB1 of the B component relative to the reference position REF1, shift amounts of a sub-pixel position PR2 of the R component, shift amounts of a sub-pixel position PG2 of the G component, and shift amounts of a sub-pixel position PB2 of the B component relative to the reference position REF2, shift amounts of a sub-pixel position PR3 of the R component, shift amounts of a sub-pixel position PG3 of the G component, and shift amounts of a sub-pixel position PB3 of the B component relative to the reference position REF3, and the like. The sub-pixel-position measuring unit 50 or the image processing unit 20 stores the shift amounts in the shift-amount storing unit 22.

It is desirable to calculate the shift amounts of the display positions of the sub-pixels with pixels described below as a unit.

Figure 8:
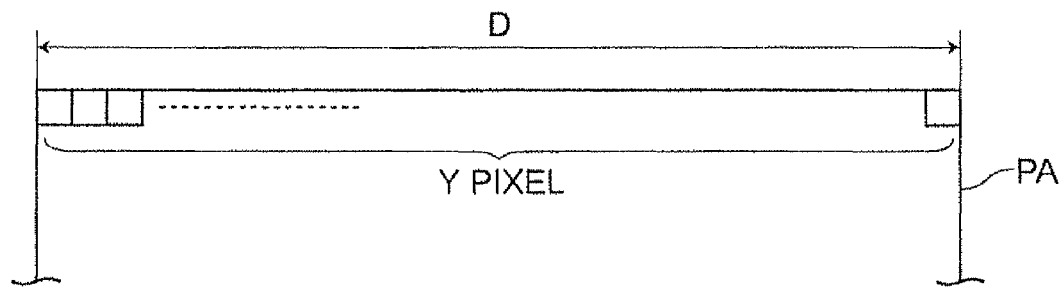
FIG. 8 is a diagram for explaining a unit of shift amounts of display positions of sub-pixels according to the first embodiment.

FIG. 8 is a diagram for explaining a unit of the shift amounts of the display positions of the sub-pixels according to the first embodiment. In FIG. 8, components same as those shown in FIG. 4 are denoted by the same reference signs and explanation of the components is omitted as appropriate.

In the projecting unit 100 of the projector 10, a size of a projection area of a projected image corresponding to zoom magnification is uniformly decided. Therefore, when the length in the horizontal direction of the projection area PA is represented as D and the number of pixels in the horizontal direction is represented as Y, by calculating a shift amount with D/Y as one unit, it is possible to specify how many pixels a numerical value of the shift amount is equivalent to.

The shift amounts in the horizontal direction of the display positions of the sub-pixels are explained with reference to FIG. 8. However, shift amounts in the vertical direction of the display positions of the sub-pixels are the same.

The image processing unit 20 of the projector 10 corrects the input image using the shift amounts acquired as described above and cause the projecting unit 100 to display an image.

Figure 9:
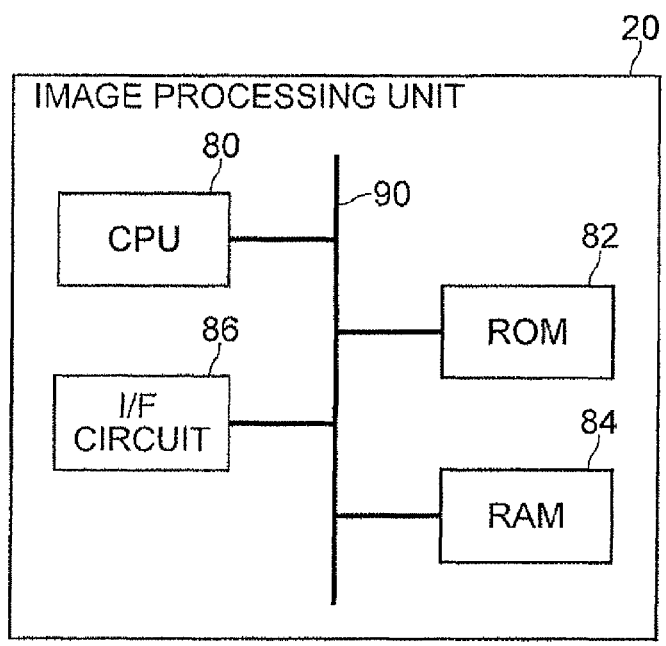
FIG. 9 is a block diagram of a hardware configuration example of an image processing unit according to the first embodiment.

FIG. 9 is a block diagram of a hardware configuration example of the image processing unit 20 according to the first embodiment.

The image processing unit 20 includes a central processing unit (CPU) 80, a read only memory (ROM) 82, a random access memory (RAM) 84, and an interface (I/F) circuit 86. The CPU 80, the ROM 82, the RAM 84, and the I/F circuit 86 are connected via a bus 90.

A program is stored in the ROM 82. The CPU 80 that reads the program via the bus 90 can execute processing corresponding to the program. The RAM 84 serves as a work memory for the CPU 80 to execute the processing. A program read by the CPU 80 is temporarily stored in the RAM 84. The I/F circuit 86 performs interface processing for input image signals from the outside.

The functions of the image-signal correcting unit 24 and the image-signal-correction control unit 30 shown in FIG. 1 are realized by the CPU 80 that reads the program stored in the ROM 82 or the RAM 84 via the bus 90 and executes the program. The function of the shift-amount storing unit 22 shown in FIG. 1 is realized by the ROM 82 or the RAM 84. The function of the input-image-signal storing unit 28 shown in FIG. 1 is realized by the I/F circuit 86 or the RAM 84.

Figure 10:
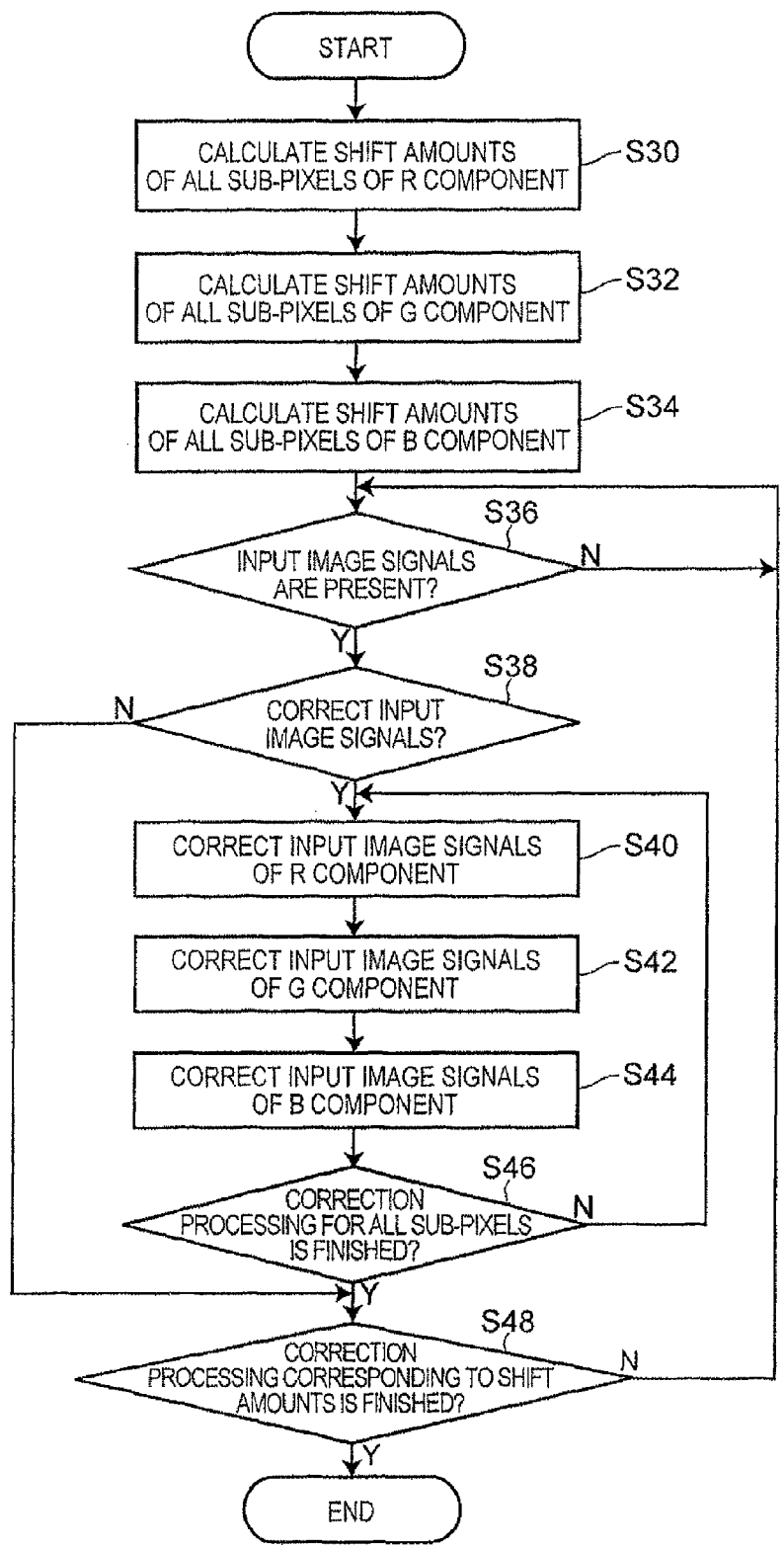
FIG. 10 is a flowchart of an example of correction processing corresponding to shift amounts according to the first embodiment.

A flowchart of an example of correction processing corresponding to shift amounts according to the first embodiment is shown in FIG. 10.

For example, a program for realizing the processing shown in FIG. 10 is stored in the ROM 82 in advance. The CPU 80 reads out the program stored in the ROM 82 and executes processing corresponding to the program. Consequently, the processing shown in FIG. 10 can be realized by software processing.

Before the image-signal correcting unit 24 corrects input image signals, the image-signal correcting unit 24 performs processing for calculating shift amounts of display positions of all sub-pixels in the projection area PA. Therefore, first, the image-signal correcting unit 24 (the shift-amount calculating unit 26) calculates shift amounts of all sub-pixels of the R component (step S30). More specifically, the image-signal correcting unit 24 (the shift-amount calculating unit 26) calculates, with interpolation processing, shift amounts of all sub-pixels in a projected image using shift amounts of sampling sub-pixels stored in the shift-amount storing unit 22. As this interpolation processing, there are a bi-linear method, a nearest neighbor method, a bi-cubic method, and the like.

Similarly, the image-signal correcting unit 24 (the shift-amount calculating unit 26) calculates shift amounts of all sub-pixels of the G component and the B component (steps S32 and S34). In steps S32 and S34, as in step S30, the image-signal correcting unit 24 (the shift-amount calculating unit 26) calculates, with interpolation processing, shift amounts of all sub-pixels in the projected image using the shift amounts of the sampling sub-pixels stored in the shift-amount storing unit 22. As this interpolation processing, there are the bi-linear method, the nearest neighbor method, the bi-cubic method, and the like.

The image-signal correcting unit 24 discriminates presence or absence of input image signals (step S36). More specifically, the image-signal correcting unit 24 discriminates presence or absence of input image signals as correction objects by discriminating whether input image signals are stored in the input-image-signal storing unit 28. When it is discriminated in step S36 that input image signals are not present (step S36: N), the image-signal correcting unit 24 waits for input of input image signals.

When it is discriminated in step S36 that input image signals are present (step S36: Y), the image-signal correcting unit 24 judges whether correction processing should be applied to the input image signals on the basis of a correction control signal from the zoom-state detecting unit 60 (step S38). For example, when a zoom state of the projecting unit 100 is not a maximum telephoto state (step S38: Y) according to a detection result of the zoom-state detecting unit 60, the image-signal correcting unit 24 judges that correction processing for the input image signals is performed. When the zoom state is the maximum telephoto state (step S38: N), the image-signal correcting unit 24 omits the correction processing for the input image signals.

When it is judged in step S38 that the correction processing is applied to the input image signals (step S38: Y), the image-signal correcting unit 24 applies the correction processing to input image signals of the R component among the input image signals using the shift amounts calculated in step S30 (step S40). Subsequently, the image-signal correcting unit 24 applies the correction processing to input image signals of the G component among the input image signals using the shift amounts calculated in step S32 (step S42). The input-signal correcting unit 24 applies the correction processing to input image signals of the B component among the input image signals using the shift amounts calculated in step S34 (step S44).

Figure 11:
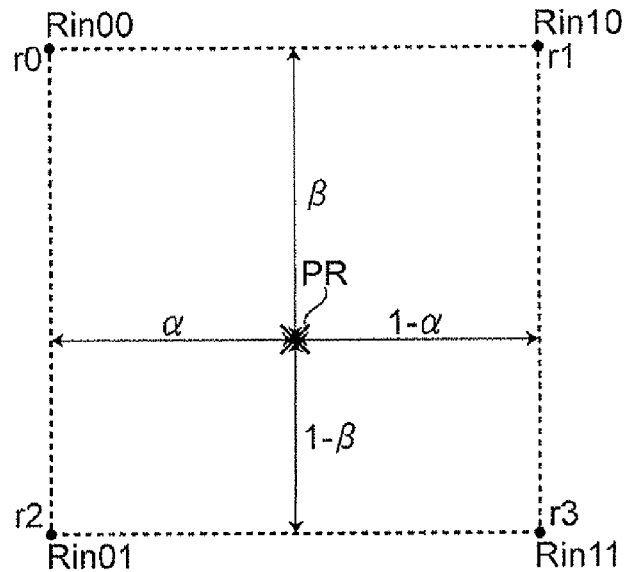
FIG. 11 is a diagram for explaining processing for correcting an input image signal according to the first embodiment.

FIG. 11 is a diagram for explaining the correction processing for input image signals according to the first embodiment. In FIG. 11, the correction processing for input image signals of the sub-pixels of the R component is shown. However, the correction processing for input image signals of the sub-pixels of the G component and the B component is the same.

For example, an input image signal Rx corresponding to a display pixel PR of a sub-pixel shifted by a shift amount for a pixels in the horizontal direction and shifted by a shift amount for β pixels in the vertical direction with respect to an original display pixel Rin00 of a sub-pixel of the R component can be calculated by performing interpolation processing using input image signals of the display pixels Rin00, Rin10, Rin01, and Rin11 of four sub-pixels around the display pixel PR. In the following explanation, it is assumed that α and β are positive integers equal to or smaller than 1.

$$Rx = ((1-\alpha)*r0 + \alpha*r1)*(1-\beta) + ((1-\alpha)*r2 + \alpha*r3)*\beta$$

In the explanation with reference to FIG. 11, shift amounts are calculated by the bi-linear method. However, the input image signals may be corrected by the nearest neighbor method and the bi-cubic method.

Referring back to FIG. 10, until the correction processing for all the sub-pixels in the projected image is finished (step S46: N), the image-signal correcting unit 24 returns to step S40 and applies the correction processing to the respective sub-pixels in the image. On the other hand, when the correction processing is finished for all the sub-pixels in the projected image (step S46: Y), when it is judged in step S38 that the correction processing is not applied to the input image signals (step S38: N), or when the correction processing corresponding to the shift amounts is not finished (step S48: N), the image-signal correcting unit 24 returns to step S36 and continues the processing. When the correction processing corresponding to the shift amounts is finished (step S48: Y), the image-signal correcting unit 24 finishes the series of processing (end).

Figure 12:
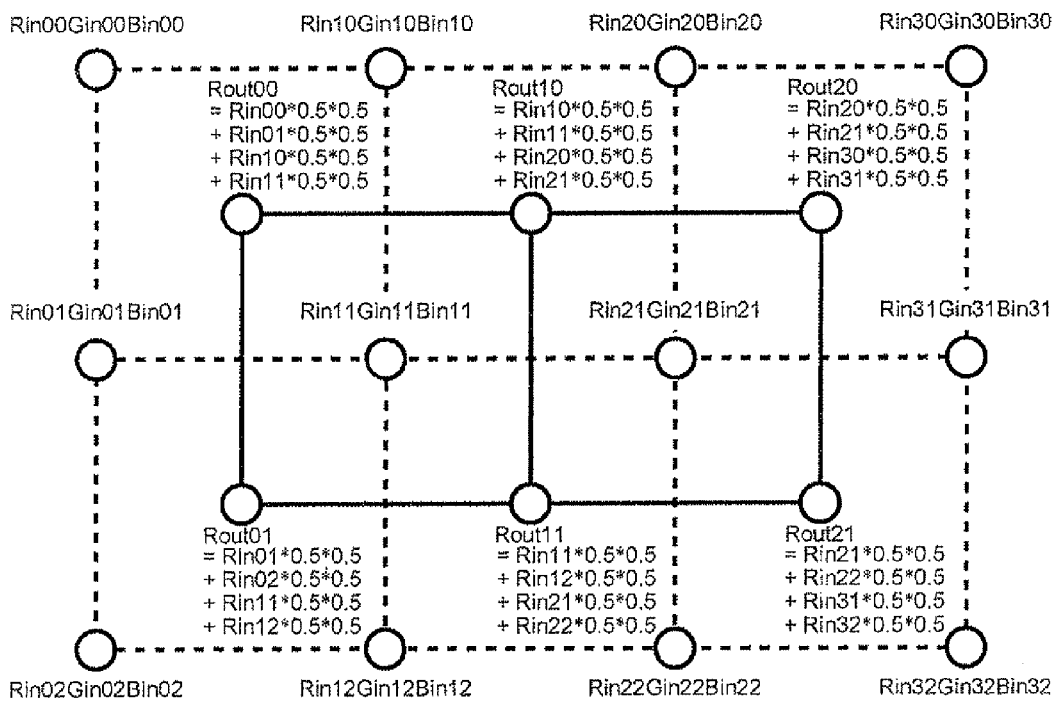
FIG. 12 is a diagram for explaining an example of processing for correcting input image signals of sub-pixels of an R component according to the first embodiment.

FIG. 12 is a diagram for explaining an example of correction processing for input image signals of sub-pixels of the R component according to the first embodiment. An area at the upper left corner of the projected image shown in FIG. 7 is schematically shown in FIG. 12.

In FIG. 12, input image signals of sub-pixels forming each of pixels and display pixels projected on the basis of the input image signals are schematically shown. Input image signals (pixel values) of the sub-pixels of the R component are represented as Rin00, Rin10, Rin20, Rin30, Rin01, Rin11, Rin21, Rin31, Rin02, Rin12, Rin22, and Rin32. The sub-pixels of the R component after the correction processing are represented as Rout00, Rout10, Rout20, Rout01, Rout11, and Rout21.

Shift amounts of the respective sub-pixels may be different for each of the sub-pixels. However, in FIG. 12, it is assumed that shift amounts of the sub-pixels of the R component Rout00, Rout10, Rout20, Rout01, Rout11, and Rout21 are identical and the sub-pixels shift by 0.5 pixel in the horizontal direction and 0.5 pixel in the vertical direction from one another.

In this case, image signals (pixel values) Rout00 and Rout10 of the sub-pixels of the R component are calculated as indicated by the following formula according to, for example, the bi-linear method:

$$Rout00 = Rin00 \times 0.5 \times 0.5 + Rin01 \times 0.5 \times 0.5 + Rin10 \times 0.5 \times 0.5 + Rin11 \times 0.5 \times 0.5$$

$$Rout10 = Rin10 \times 0.5 \times 0.5 + Rin11 \times 0.5 \times 0.5 + Rin20 \times 0.5 \times 0.5 + Rin21 \times 0.5 \times 0.5$$

Other image signals (e.g., Rout20 and Rout01) of the sub-pixels of the R component shown in FIG. 12 are calculated in the same manner.

The processing described above is performed in step S40 shown in FIG. 10.

Figure 13:
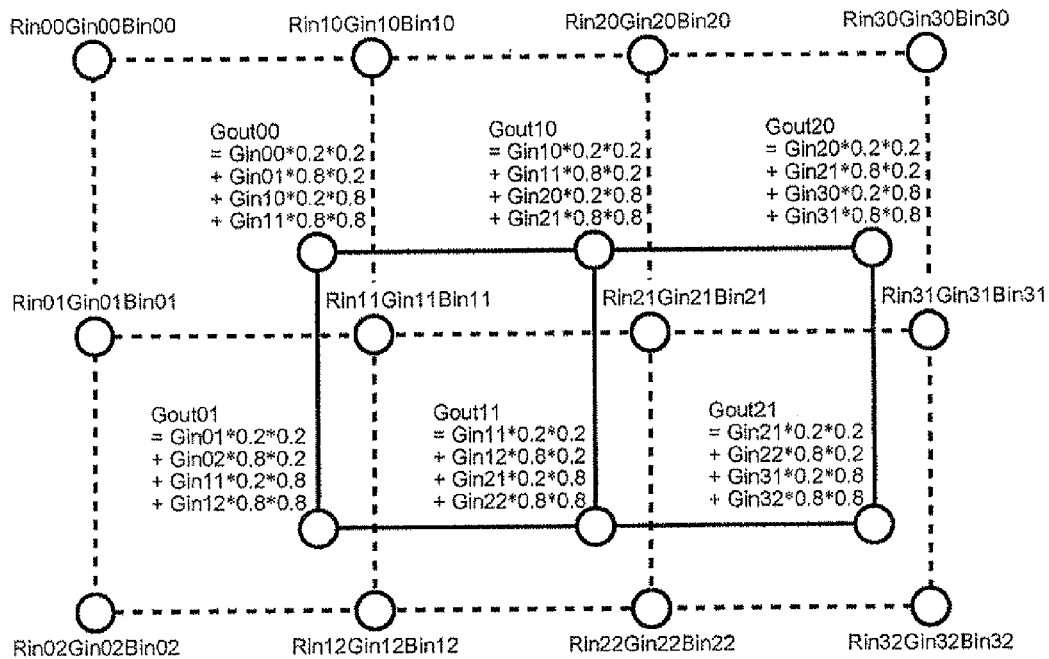
FIG. 13 is a diagram for explaining an example of processing for correcting input image signals of sub-pixels of a G component according to the first embodiment.

FIG. 13 is a diagram for explaining an example of correction processing for input image signals of sub-pixels of the G component according to the first embodiment. An area at the upper left corner of the projected image shown in FIG. 7 is schematically shown in FIG. 13. In FIG. 13, components same as those shown in FIG. 12 are denoted by the same reference signs and explanation of the components is omitted as appropriate.

In FIG. 13, input image signals of sub-pixels forming each of pixels and display pixels projected on the basis of the input image signals are schematically shown. Input image signals (pixel values) of the sub-pixels of the G component are represented as Gin00, Gin10, Gin20, Gin30, Gin01, Gin11, Gin21, Gin31, Gin02, Gin12, Gin22, and Gin32. The sub-pixels of the G component after the correction processing are represented as Gout00, Gout10, Gout20, Gout01, Gout11, and Gout21.

Shift amounts of the respective sub-pixels may be different for each of the sub-pixels. However, in FIG. 13, it is assumed that shift amounts of the sub-pixels of the G component Gout00, Gout10, Gout20, Gout01, Gout11, and Gout21 are identical and the sub-pixels shift by 0.8 pixel in the horizontal direction and 0.8 pixel in the vertical direction from one another.

In this case, image signals (pixel values) Gout00 and Gout10 of the sub-pixels of the G component are calculated as indicated by the following formula according to, for example, the bi-linear method:

$$Gout00 = Gin00 \times 0.2 \times 0.2 + Gin01 \times 0.8 \times 0.2 + Gin10 \times 0.2 \times 0.8 + Gin11 \times 0.8 \times 0.8$$

$$Gout10 = Gin10 \times 0.2 \times 0.2 + Gin11 \times 0.8 \times 0.2 + Gin20 \times 0.2 \times 0.8 + Gin21 \times 0.8 \times 0.8$$

Other image signals (e.g., Gout20 and Gout01) of the sub-pixels of the G component shown in FIG. 13 are calculated in the same manner.

The processing described above is performed in step S42 shown in FIG. 10.

Figure 14:
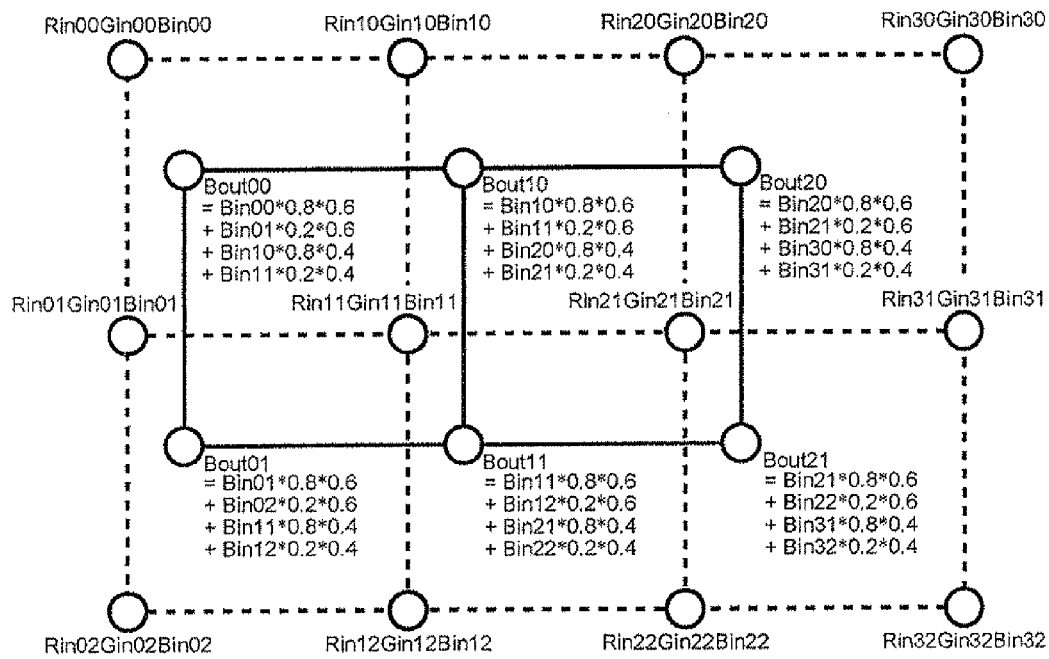
FIG. 14 is a diagram for explaining an example of processing for correcting input image signals of sub-pixels of a B component according to the first embodiment.

FIG. 14 is a diagram for explaining an example of correction processing for input image signals of sub-pixels of the B component according to the first embodiment. An area at the upper left corner of the projected image shown in FIG. 7 is schematically shown in FIG. 14. In FIG. 14, components same as those shown in FIG. 12 are denoted by the same reference signs and explanation of the components is omitted as appropriate.

In FIG. 14, input image signals of sub-pixels forming each of pixels and display pixels projected on the basis of the input image signals are schematically shown. Input image signals (pixel values) of the sub-pixels of the B component are represented as Bin00, Bin10, Bin20, Bin30, Bin01, Bin11, Bin21, Bin31, Bin02, Bin12, Bin22, and Bin32. The sub-pixels of the B component after the correction processing are represented as Bout00, Bout10, Bout20, Bout01, Bout11, and Bout21.

Shift amounts of the respective sub-pixels may be different for each of the sub-pixels. However, in FIG. 14, it is assumed that shift amounts of the sub-pixels of the B component Bout00, Bout10, Bout20, Bout01, Bout11, and Bout21 are identical and the sub-pixels shift by 0.2 pixel in the horizontal direction and 0.4 pixel in the vertical direction from one another.

In this case, image signals (pixel values) Bout00 and Bout10 of the sub-pixels of the B component are calculated as indicated by the following formula according to, for example, the bi-linear method:

$$Bout00 = Bin00 \times 0.8 \times 0.6 + Bin01 \times 0.2 \times 0.6 + Bin10 \times 0.8 \times 0.4 + Bin11 \times 0.2 \times 0.4$$

$$Bout10 = Bin10 \times 0.8 \times 0.6 + Bin11 \times 0.2 \times 0.6 + Bin20 \times 0.8 \times 0.4 + Bin21 \times 0.2 \times 0.4$$

Other image signals (e.g., Bout20 and Bout01) of the sub-pixels of the B component shown in FIG. 14 are calculated in the same manner.

The processing described above is performed in step S44 shown in FIG. 10.

As explained above, in the first embodiment, shift amounts of display positions of sub-pixels forming one pixel are stored, shift amounts of all sub-pixels in an image are calculated, and input image signals of the sub-pixels are corrected according to the shift amounts. Therefore, it is possible to prevent deterioration in an image quality due to shifts of the display positions of the sub-pixels forming one pixel.

In the explanation of the first embodiment, it is assumed that the sampling sub-pixels are present in nine places. However, the invention is not limited to the sampling sub-pixels present in nine places.

First Modification of the First Embodiment

In the explanation of the first embodiment, it is assumed that the shift-amount storing unit 22 stores only one set of shift amounts of the sampling sub-pixels for nine places. However, the invention is not limited to this. It is also possible that a shift-amount storing unit stores plural sets of shift amount groups and correction processing is applied to input image signals by using shift amounts selected out of the shift amount groups.

Figure 15:
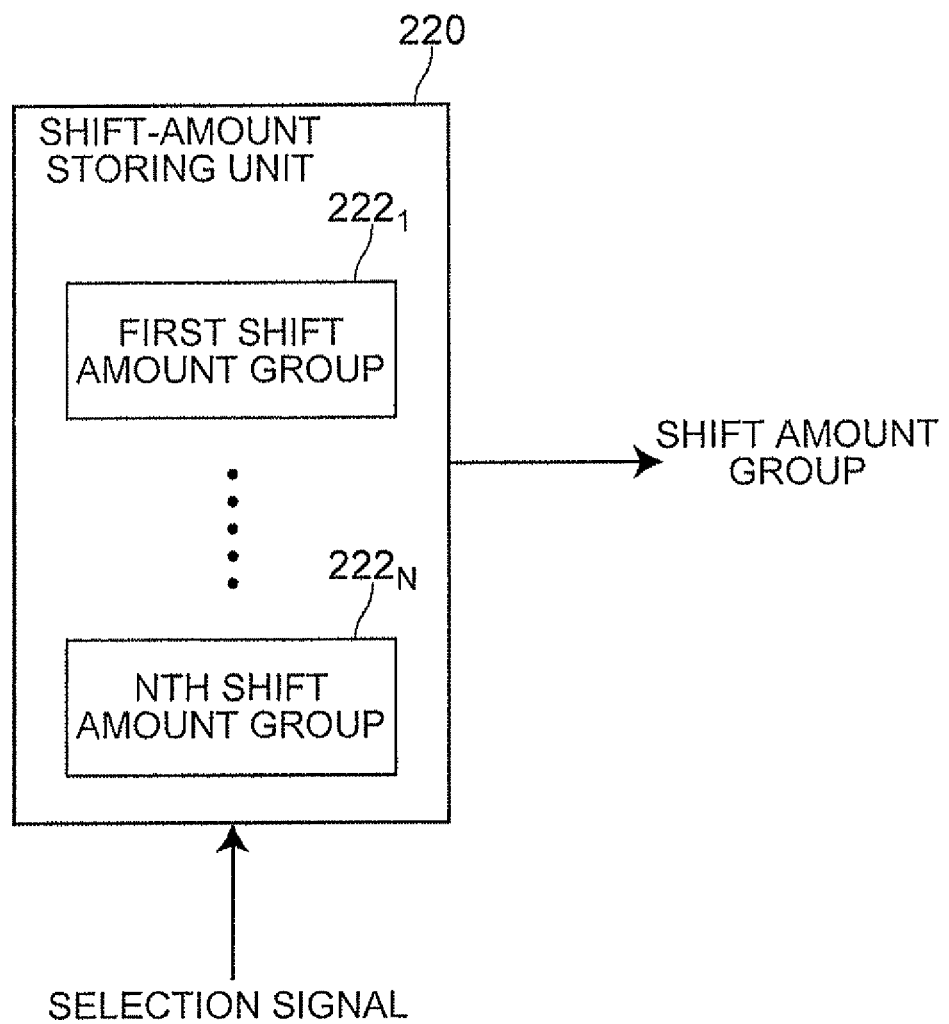
FIG. 15 is a diagram of an overview of a configuration of a shift-amount storing unit according to a first modification of the first embodiment.

FIG. 15 is a diagram of an overview of a configuration of a shift-amount storing unit according to a first modification of the first embodiment.

A shift-amount storing unit 220 according to the first modification of the first embodiment is included in the projector 10 instead of the shift-amount storing unit 22 shown in FIG. 1. The shift-amount storing unit 220 includes first to Nth (N is an integer equal to or larger than 2) shift amount groups $222_1$ to $222_N$. Each of the shift amount groups includes shift amounts of sampling sub-pixels of the R component, the G component, and the B component for nine places in a projected image.

A configuration of a projector according to the first modification of the first embodiment is the same as the configuration of the projector 10 according to the first embodiment shown in FIG. 1. Therefore, detailed explanation of the configuration is omitted.

A given selection signal is inputted to the shift-amount storing unit 220. The shift-amount storing unit 220 outputs one shift amount group selected according to the selection signal. This shift amount group is supplied to the image-signal correcting unit 24 (the shift-amount calculating unit 26) shown in FIG. 1. A selection signal may be generated on the basis of for example, a correction control signal from the zoom-state detecting unit 60. According to a selection signal corresponding to zoom magnification of the projecting unit 100 detected by the zoom-state detecting unit 60, the shift-amount storing unit 220 can output a shift amount group corresponding to the zoom magnification of the projecting unit 100 out of the first to Nth shift amount groups $222_1$ to $222_N$.

Each of the first to Nth shift amount groups $222_1$ to $222_N$ is obtained by imaging the projected image of the pattern image as shown in FIG. 3 while changing an operating environment of the projector. When each of the shift amount groups is acquired, a pattern image may be changed for the shift amount group. In other words, it is also possible that a pattern image corresponding to shift amount groups is projected and each of the shift amount groups is obtained by imaging a projected image of the pattern image and calculating shift amounts.

Figure 16:
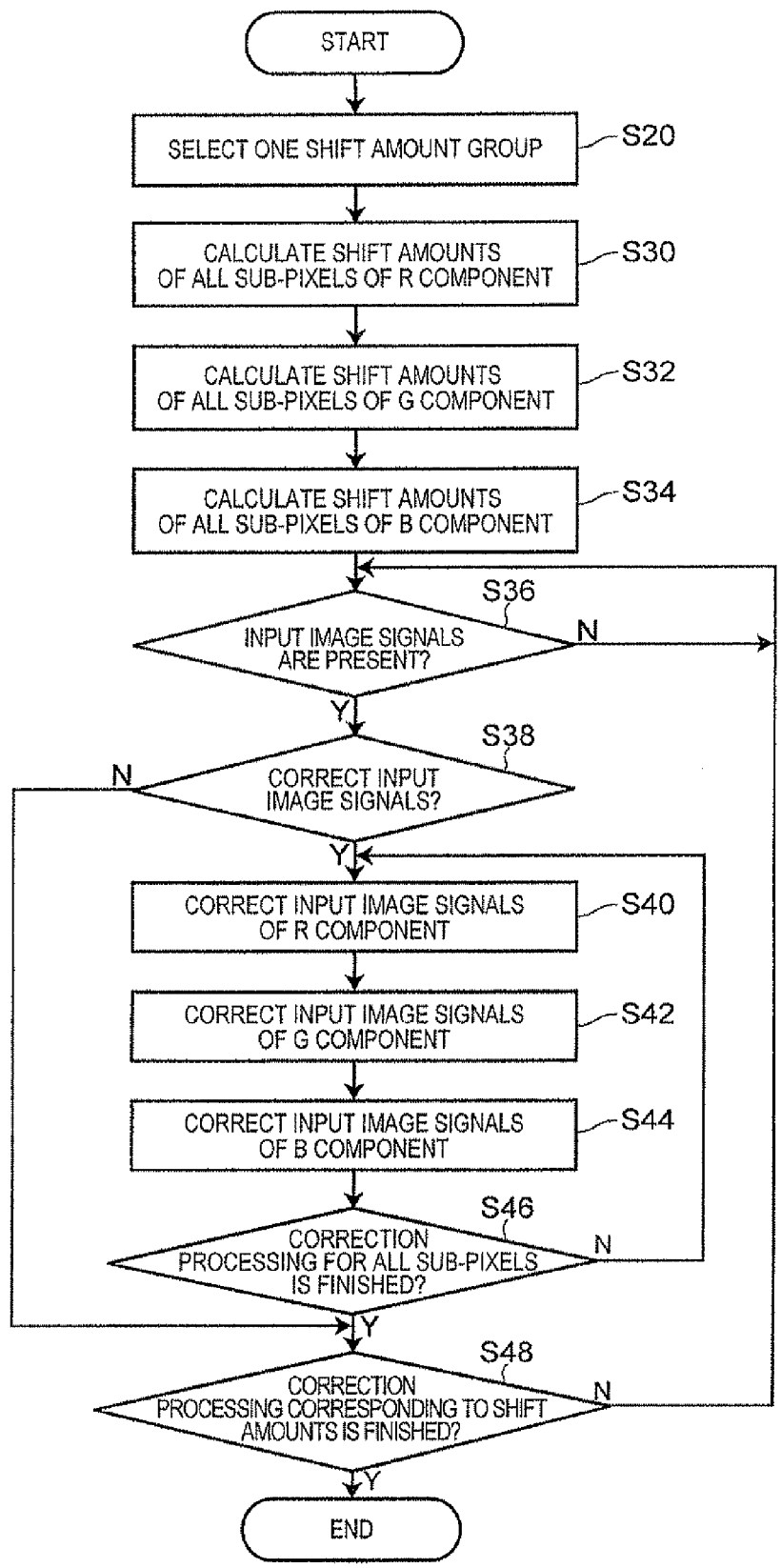
FIG. 16 is a flowchart of an example of correction processing corresponding to shift amounts according to the first modification of the first embodiment.

FIG. 16 is a flowchart of an example of correction processing corresponding to shift amounts according to the first modification of the first embodiment.

For example, a program for realizing processing shown in FIG. 16 is stored in the ROM 82 in advance. The CPU 80 reads out the program stored in the ROM 82 and executes the processing corresponding to the program, whereby the processing shown in FIG. 16 can be realized by software processing.

First, the shift-amount storing unit 220 outputs one shift amount group corresponding to a given selection signal (step S20). The image-signal correcting unit 24 (the shift-amount calculating unit 26) calculates shift amounts of all sub-pixels of the R component, the G component, and the B component using the shift amount group selected in step S20.

The image-signal correcting unit 24 (the shift-amount calculating unit 26) calculates shift amounts of all sub-pixels of the R component (step S30). More specifically, the image-signal correcting unit 24 (the shift-amount calculating unit 26) calculates, with interpolation processing, shift amounts of all sub-pixels in a projected image using shift amounts of sampling sub-pixels stored in the shift-amount storing unit 22. As this interpolation processing, there are the bi-linear method, the nearest neighbor method, the bi-cubic method, and the like.

Similarly, the image-signal correcting unit 24 (the shift-amount calculating unit 26) calculates shift amounts of all sub-pixels of the G component and the B component (steps S32 and S34). In steps S32 and S34, as in step S30, the image-signal correcting unit 24 (the shift-amount calculating unit 26) calculates, with interpolation processing, shift amounts of all sub-pixels in the projected image using the shift amounts of the sampling sub-pixels stored in the shift-amount storing unit 22. As this interpolation processing, there are the bi-linear method, the nearest neighbor method, the bi-cubic method, and the like.

The image-signal correcting unit 24 discriminates presence or absence of input image signals (step S36). More specifically, the image-signal correcting unit 24 discriminates presence or absence of input image signals as correction objects by discriminating whether input image signals are stored in the input-image-signal storing unit 28. When it is discriminated in step S36 that input image signals are not present (step S36: N), the image-signal correcting unit 24 waits for input of input image signals.

When it is discriminated in step S36 that input image signals are present (step S36: Y), the image-signal correcting unit 24 judges whether correction processing should be applied to the input image signals on the basis of a correction control signal from the zoom-state detecting unit 60 (step S38). For example, when a zoom state of the projecting unit 100 is not a maximum telephoto state (step S38: Y) according to a detection result of the zoom-state detecting unit 60, the image-signal correcting unit 24 judges that correction processing for the input image signals is performed. When the zoom state is the maximum telephoto state (step S38: N), the image-signal correcting unit 24 omits the correction processing for the input image signals.

When it is judged in step S38 that the correction processing is applied to the input image signals (step S38: Y), the image-signal correcting unit 24 applies the correction processing to input image signals of the R component among the input image signals using the shift amounts calculated in step S30 (step S40). Subsequently, the image-signal correcting unit 24 applies the correction processing to input image signals of the G component among the input image signals using the shift amounts calculated in step S32 (step S42). The input-signal correcting unit 24 applies the correction processing to input image signals of the B component among the input image signals using the shift amounts calculated in step S34 (step S44).

Thereafter, until the correction processing for all the sub-pixels in the projected image is finished (step S46: N), the image-signal correcting unit 24 returns to step S40 and applies the correction processing to the respective sub-pixels in the image. On the other hand, when the correction processing is finished for all the sub-pixels in the projected image (step S46: Y), when it is judged in step S38 that the correction processing is not applied to the input image signals (step S38: N), or when the correction processing corresponding to the shift amounts is not finished (step S48: N), the image-signal correcting unit 24 returns to step S36 and continues the processing. When the correction processing corresponding to the shift amounts is finished (step S48: Y), the image-signal correcting unit 24 finishes the series of processing (end).

As explained above, in the first modification of the first embodiment, the shift-amount storing unit 220 can store plural sets of shift amount groups of display positions of sub-pixels. The image-signal correcting unit 24 can correct input image signals using a set of shift amount groups of display positions of sub pixels corresponding to a correction control signal among the plural sets of shift amount groups of the display positions of the sub-pixels stored in the shift-amount storing unit 220.

Second Modification of the First Embodiment

In the first modification of the first embodiment, when one shift amount group is selected from the shift-amount storing unit 220, shift amounts are not changed in the correction processing for the images signals of the sub-pixels in the image. However, the invention is not limited to this.

A configuration of a projector according to a second modification of the first embodiment is the same as the configuration of the projector according to the first modification of the first embodiment. Therefore, detailed explanation of the configuration is omitted.

Figure 17:
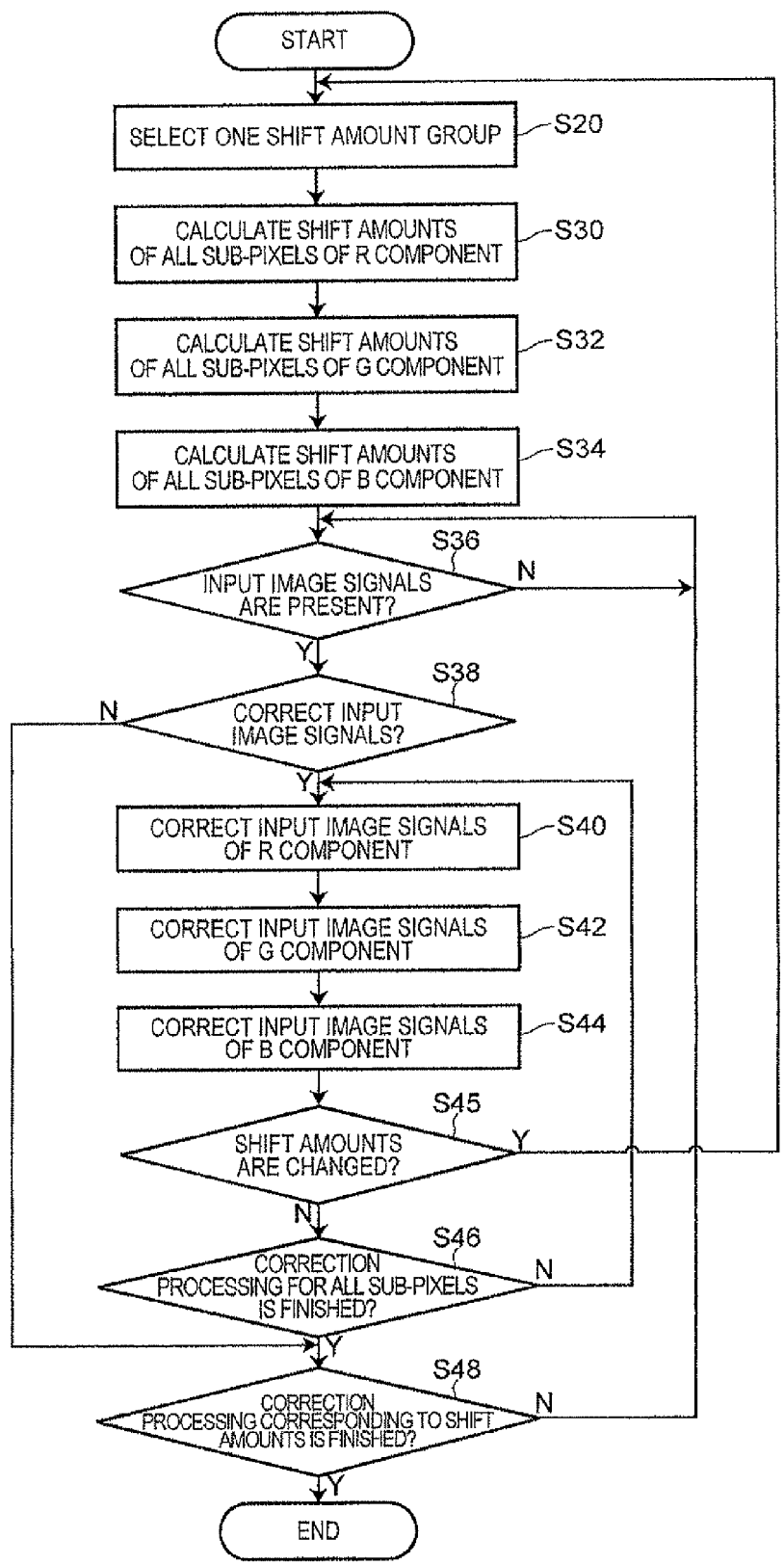
FIG. 17 is a flowchart of an example of correction processing corresponding to shift amounts according to a second modification of the first embodiment.

FIG. 17 is a flowchart of an example of correction processing corresponding to shift amounts according to the second modification of the first embodiment.

For example, a program for realizing processing shown in FIG. 17 is stored in the ROM 82 in advance. The CPU 80 reads out the program stored in the ROM 82 and executes the processing corresponding to the program, whereby the processing shown in FIG. 17 can be realized by software processing.

First, the shift-amount storing unit 220 outputs one shift amount group corresponding to a given selection signal (step S20). The image-signal correcting unit 24 (the shift-amount calculating unit 26) calculates shift amounts of all sub-pixels of the R component, the G component, and the B component using the shift amount group selected in step S20.

The image-signal correcting unit 24 (the shift-amount calculating unit 26) calculates shift amounts of all sub-pixels of the R component (step S30). More specifically, the image-signal correcting unit 24 (the shift-amount calculating unit 26) calculates, with interpolation processing, shift amounts of all sub-pixels in a projected image using shift amounts of sampling sub-pixels stored in the shift-amount storing unit 22. As this interpolation processing, there are the bi-linear method, the nearest neighbor method, the bi-cubic method, and the like.

Similarly, the image-signal correcting unit 24 (the shift-amount calculating unit 26) calculates shift amounts of all sub-pixels of the G component and the B component (steps S32 and S34). In steps S32 and S34, as in step S30, the image-signal correcting unit 24 (the shift-amount calculating unit 26) calculates, with interpolation processing, shift amounts of all sub-pixels in the projected image using the shift amounts of the sampling sub-pixels stored in the shift-amount storing unit 22. As this interpolation processing, there are the bi-linear method, the nearest neighbor method, the bi-cubic method, and the like.

The image-signal correcting unit 24 discriminates presence or absence of input image signals (step S36). More specifically, the image-signal correcting unit 24 discriminates presence or absence of input image signals as correction objects by discriminating whether input image signals are stored in the input-image-signal storing unit 28. When it is discriminated in step S36 that input image signals are not present (step S36: N), the image-signal correcting unit 24 waits for input of input image signals.

When it is discriminated in step S36 that input image signals are present (step S36: Y), the image-signal correcting unit 24 judges whether correction processing should be applied to the input image signals on the basis of a correction control signal from the zoom-state detecting unit 60 (step S38). For example, when a zoom state of the projecting unit 100 is not a maximum telephoto state (step S38: Y) according to a detection result of the zoom-state detecting unit 60, the image-signal correcting unit 24 judges that correction processing for the input image signals is performed. When the zoom state is the maximum telephoto state (step S38: N), the image-signal correcting unit 24 omits the correction processing for the input image signals.

When it is judged in step S38 that the correction processing is applied to the input image signals (step S38: Y), the image-signal correcting unit 24 applies the correction processing to input image signals of the R component among the input image signals using the shift amounts calculated in step S30 (step S40). Subsequently, the image-signal correcting unit 24 applies the correction processing to input image signals of the G component among the input image signals using the shift amounts calculated in step S32 (step S42). The input-signal correcting unit 24 applies the correction processing to input image signals of the B component among the input image signals using the shift amounts calculated in step S34 (step S44).

Thereafter, when it is judged that it is necessary to change the shift amounts of the sub-pixels (step S45: Y) because of a change in an operating environment of the projector 10 such as a change in a zoom state of the projecting unit 100, the image processing unit 20 returns to step S20 selects, on the basis of a selection signal, another shift amount group out of the first to Nth shift amount groups stored in the shift-amount storing unit 220 and calculates shift amounts of all the sub-pixels again.

When it is judged in step S45 that it is unnecessary to change the shift amounts of the sub-pixels (step S45: N), until the correction processing for all the sub-pixels in the projected image is finished (step S46: N), the image-signal correcting unit 24 returns to step S40 and applies the correction processing to the respective sub-pixels in the image. On the other hand, when the correction processing is finished for all the sub-pixels in the projected image (step S46: Y), when it is judged in step S38 that the correction processing is not applied to the input image signals (step S38: N), or when the correction processing corresponding to the shift amounts is not finished (step S48: N), the image-signal correcting unit 24 returns to step S36 and continues the processing. When the correction processing corresponding to the shift amounts is finished (step S48: Y), the image-signal correcting unit 24 finishes the series of processing (end).

A configuration of a projector according to a second modification of the first embodiment is the same as the configuration of the projector according to the first modification of the first embodiment. Therefore, detailed explanation of the configuration is omitted.

Second Embodiment

In the first embodiment and the modifications thereof, the shift amounts relative to the reference position in the image are used for each of sub-pixels forming one pixel. However, the invention is not limited to this. In a second embodiment of the invention, a display position of one sub-pixel among plural sub-pixels forming one pixel is set as a reference position and a shift amount of another sub-pixel is calculated.

Figure 18:
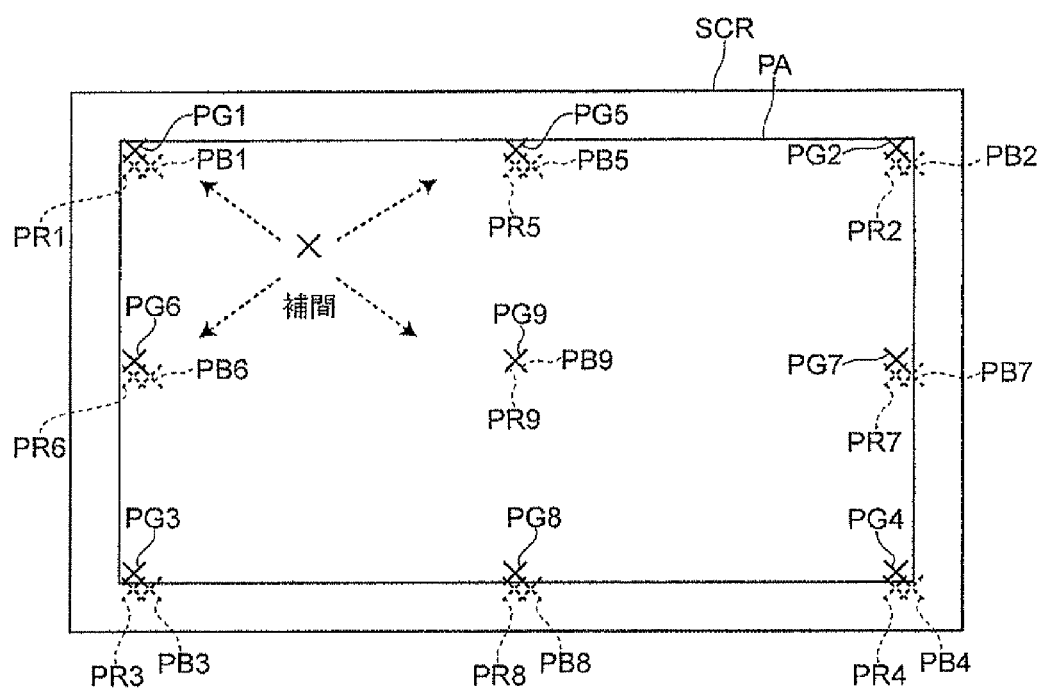
FIG. 18 is a diagram for explaining shift amounts according to a second embodiment of the invention.

FIG. 18 is a diagram for explaining shift amounts according to the second embodiment. In FIG. 18, components same as those shown in FIG. 7 are denoted by the same reference numerals and explanation of the components is omitted.

In the second embodiment, the sub-pixel-position measuring unit 50 or the image processing unit 20 acquires imaging data of the display pixels DG1 to DG9 of the sub-pixels of the G component shown in FIG. 6A according to the imaging by the sub-pixel-position measuring unit 50. Thereafter, the sub-pixel-position measuring unit 50 or the image processing unit 20 determines a sub-pixel position of the G component out of an area of each of the display pixels DG1 to DG9 of the sub-pixels of the G component. More specifically, the area of each of the display pixels has plural imaging pixels and one imaging pixel is determined as a sub-pixel position of the G component from the area.

As this determination processing, it is possible to determine a pixel having a maximum pixel value as a sub-pixel position. For example, it is possible to calculate a luminance histogram of the area of each of the display pixels and specify a pixel having maximum luminance as a pixel having a largest pixel value. Alternatively, it is possible to calculate a luminance histogram of the area of each of the display pixels and determine a center-of-gravity position of pixels having luminance equal to or larger than a predetermined threshold as a sub-pixel position. As a result, as shown in FIG. 18, sub-pixel positions PG1 to PG9 corresponding to the display pixels DG1 to DG9 of the sub-pixels shown in FIG. 6A are determined.

Similarly, concerning the R component and the B component, sub-pixel positions corresponding to display pixels DR1 to DR9 and DB1 to DB9 of sub-pixels are determined. As a result, sub-pixel positions of sampling pixels of the R component, the G component, and the B component are determined as shown in FIG. 18.

The sub-pixel-position measuring unit 50 or the image processing unit 20 decides the display position of a sub-pixel of the G component (the sub-pixel position) PG1 among sub-pixels of the R component, the G component, and the B component forming one pixel as a reference position. The sub-pixel-position measuring unit 50 or the image processing unit 20 calculates shift amounts (a shift amount in the horizontal direction of the projected image and a shift amount in the vertical direction of the projected image) of the sub-pixel position PR1 of the R component and shift amounts of the sub-pixel position PB1 of the B component relative to the reference position, shift amounts (a shift amount in the horizontal direction of the projected image and a shift amount in the vertical direction of the projected image) of the sub-pixel position PR2 of the R component and shift amounts of the sub-pixel position PB2 of the B component relative to the display position of the sub-pixel of the G component (the sub-pixel position) PG2, shift amounts (a shift amount in the horizontal direction of the projected image and a shift amount in the vertical direction of the projected image) of the sub-pixel position PR3 of the R component and shift amounts of the sub-pixel position PB3 of the B component relative to the display position of the sub-pixel of the G component (the sub-pixel position) PG3, and the like. The sub-pixel-position measuring unit 50 or the image processing unit 20 stores the shift amounts in the shift-amount storing unit 22.

In short, in the second embodiment, when one pixel is formed by sub-pixels of plural color components, a reference position is a display position of a sub-pixel of one color component among the sub-pixels of the plural color components.

It is desirable to calculate the shift amounts of the display positions of the sub-pixels with pixels as a unit in the same manner as the first embodiment.

The image processing unit 20 of the projector 10 can correct an input image using the shift amounts acquired as described above and cause the projecting unit 100 to display an image.

A configuration of the projector according to the second embodiment is the same as the configuration of the projector according to the first embodiment. Therefore, detailed explanation of the configuration is omitted.

Figure 19:
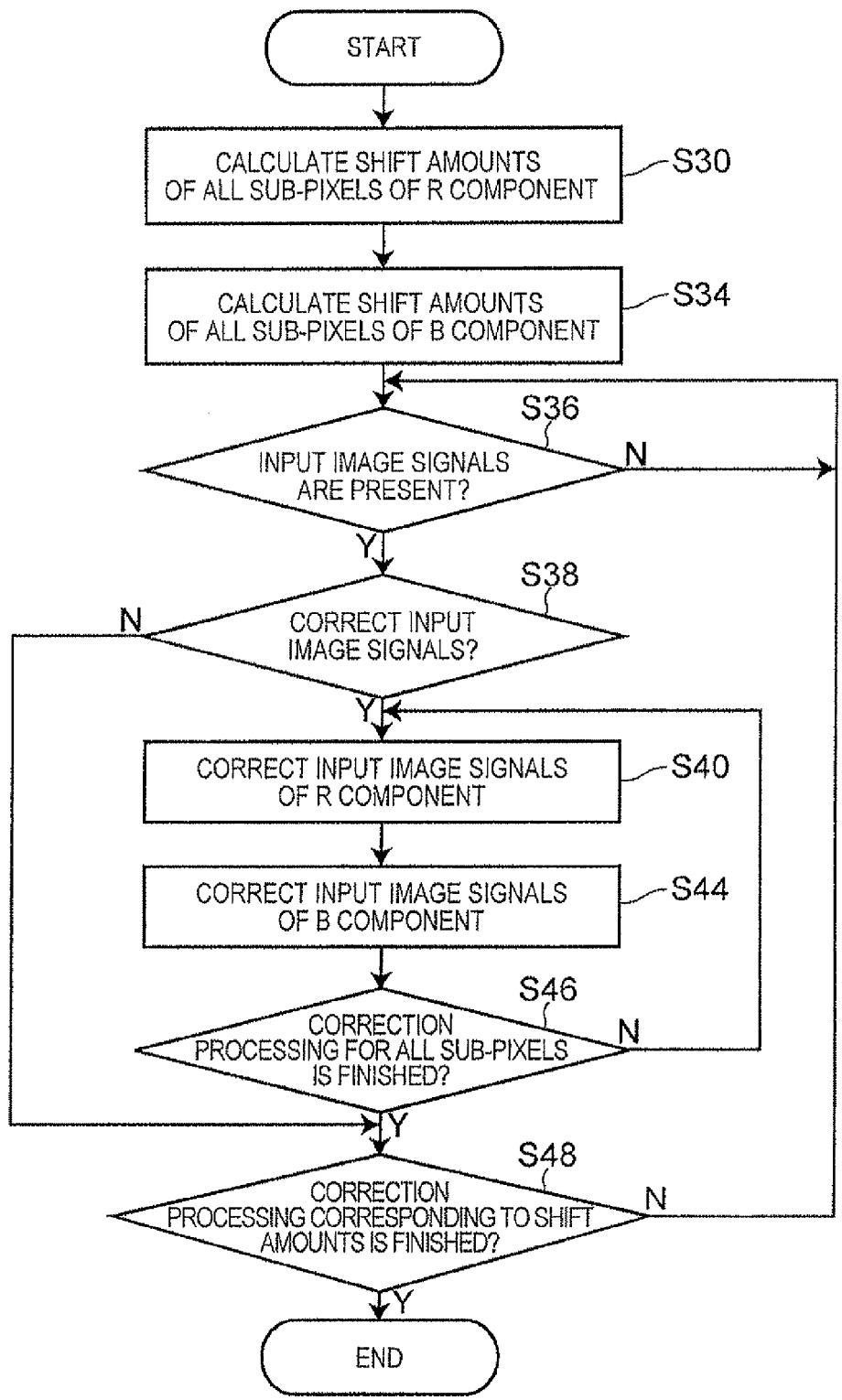
FIG. 19 is a flowchart of an example of correction processing corresponding to shift amounts according to the second embodiment.

FIG. 19 is a flowchart of an example of correction processing corresponding to the shift amounts according to the second embodiment. In FIG. 19, steps same as those shown in FIG. 10 are denoted by the same reference signs and explanation of the steps is omitted as appropriate.

For example, a program for realizing the processing shown in FIG. 19 is stored in the ROM 82 in advance. The CPU 80 reads out the program stored in the ROM 82 and executes processing corresponding to the program. Consequently, the processing shown in FIG. 19 can be realized by software processing.

Before the image-signal correcting unit 24 corrects an input image signal, the image-signal correcting unit 24 performs processing for calculating shift amounts of display positions of all sub-pixels in the projection area PA. Therefore, first, the image-signal correcting unit 24 (the shift-amount calculating unit 26) calculates shift amounts of all sub-pixels of the R component (step S30). More specifically, the image-signal correcting unit 24 (the shift-amount calculating unit 26) calculates, with interpolation processing, shift amounts of all sub-pixels in a projected image using shift amounts of sampling sub-pixels stored in the shift-amount storing unit 22. As this interpolation processing, there are a bi-linear method, a nearest neighbor method, a bi-cubic method, and the like.

Similarly, the image-signal correcting unit 24 (the shift-amount calculating unit 26) calculates shift amounts of all sub-pixels of the B component (step S34). In step S34, as in step S30, the image-signal correcting unit 24 (the shift-amount calculating unit 26) calculates, with interpolation processing, shift amounts of all sub-pixels in the projected image using the shift amounts of the sampling sub-pixels stored in the shift-amount storing unit 22. As this interpolation processing, there are the bi-linear method, the nearest neighbor method, the bi-cubic method, and the like.

The image-signal correcting unit 24 discriminates presence or absence of input image signals (step S36). More specifically, the image-signal correcting unit 24 discriminates presence or absence of input image signals as correction objects by discriminating whether input image signals are stored in the input-image-signal storing unit 28. When it is discriminated in step S36 that input image signals are not present (step S36: N), the image-signal correcting unit 24 waits for input of input image signals.

When it is discriminated in step S36 that input image signals are present (step S36: Y), the image-signal correcting unit 24 judges whether correction processing should be applied to the input image signals on the basis of a correction control signal from the zoom-state detecting unit 60 (step S38). For example, when a zoom state of the projecting unit 100 is not a maximum telephoto state (step S38: Y) according to a detection result of the zoom-state detecting unit 60, the image-signal correcting unit 24 judges that correction processing for the input image signals is performed. When the zoom state is the maximum telephoto state (step S38: N), the image-signal correcting unit 24 omits the correction processing for the input image signals.

When it is judged in step S38 that the correction processing is applied to the input image signals (step S38: Y), the image-signal correcting unit 24 applies the correction processing to input image signals of the R component among the input image signals using the shift amounts calculated in step S30 (step S40). Subsequently, the image-signal correcting unit 24 applies the correction processing to input image signals of the B component among the input image signals using the shift amounts calculated in step S32 (step S44).

Until the correction processing for all the sub-pixels in the projected image described above is finished (step S46: N), the image-signal correcting unit 24 returns to step S40 and applies the correction processing to the respective sub-pixels in the image. On the other hand, when the correction processing is finished for all the sub-pixels in the projected image (step S46: Y), when it is judged in step S38 that the correction processing is not applied to the input image signals (step S38: N), or when the correction processing corresponding to the shift amounts is not finished (step S48: N), the image-signal correcting unit 24 returns to step S36 and continues the processing. When the correction processing corresponding to the shift amounts is finished (step S48: Y), the image-signal correcting unit 24 finishes the series of processing (end).

Figure 20:
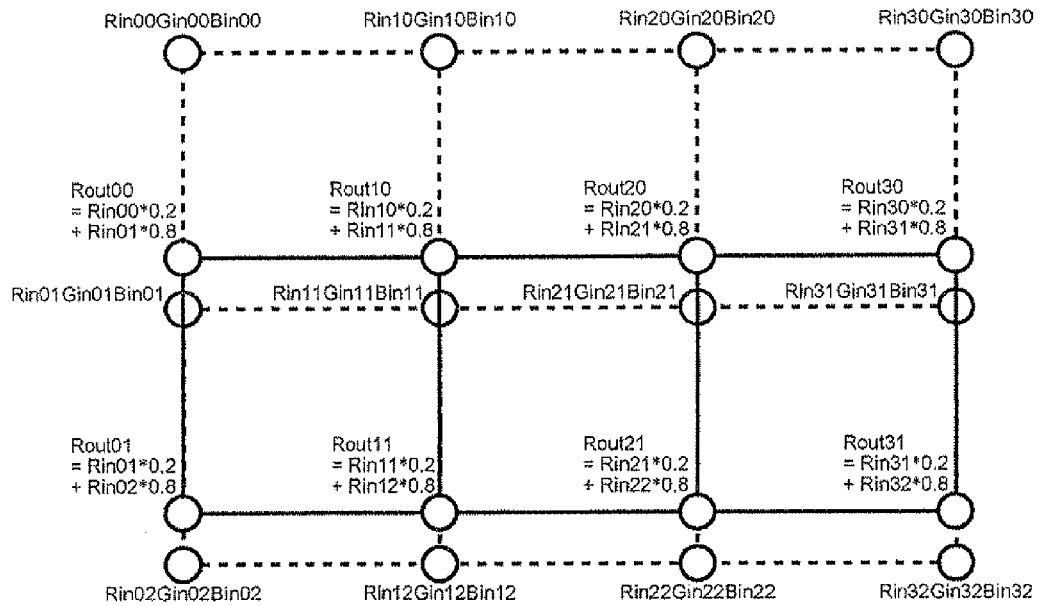
FIG. 20 is a diagram for explaining an example of processing for correcting input image signals of sub-pixels of the R component according to the second embodiment.

FIG. 20 is a diagram for explaining an example of correction processing for input image signals of sub-pixels of the R component according to the second embodiment. An area at the upper left corner of the projected image shown in FIG. 18 is schematically shown in FIG. 20.

In FIG. 20, input image signals of sub-pixels forming each of pixels and display pixels projected on the basis of the input image signals are schematically shown. Input image signals (pixel values) of the sub-pixels of the R component are represented as Rin00, Rin10, Rin20, Rin30, Rin01, Rin11, Rin21, Rin31, Rin02, Rin12, Rin22, and Rin32. The sub-pixels of the R component after the correction processing are represented as Rout00, Rout10, Rout20, Rout01, Rout11, and Rout21.

Shift amounts of the respective sub-pixels may be different for each of the sub-pixels. However, in FIG. 20, it is assumed that shift amounts of the sub-pixels of the R component Rout00, Rout10, Rout20, Rout01, Rout11, and Rout21 are identical and the sub-pixels shift by 0 pixel in the horizontal direction and 0.8 pixel in the vertical direction from one another.

In this case, image signals (pixel values) Rout00 and Rout10 of the sub-pixels of the R component are calculated as indicated by the following formula according to, for example, the bi-linear method:

$Rout00 = Rin00 \times 0.2 + Rin01 \times 0.8$ $Rout10 = Rin10 \times 0.2 + Rin11 \times 0.8$ Other image signals (e.g., Rout20 and Rout01) of the sub-pixels of the R component shown in FIG. 20 are calculated in the same manner.

The processing described above is performed in step S40 shown in FIG. 19.

Figure 21:
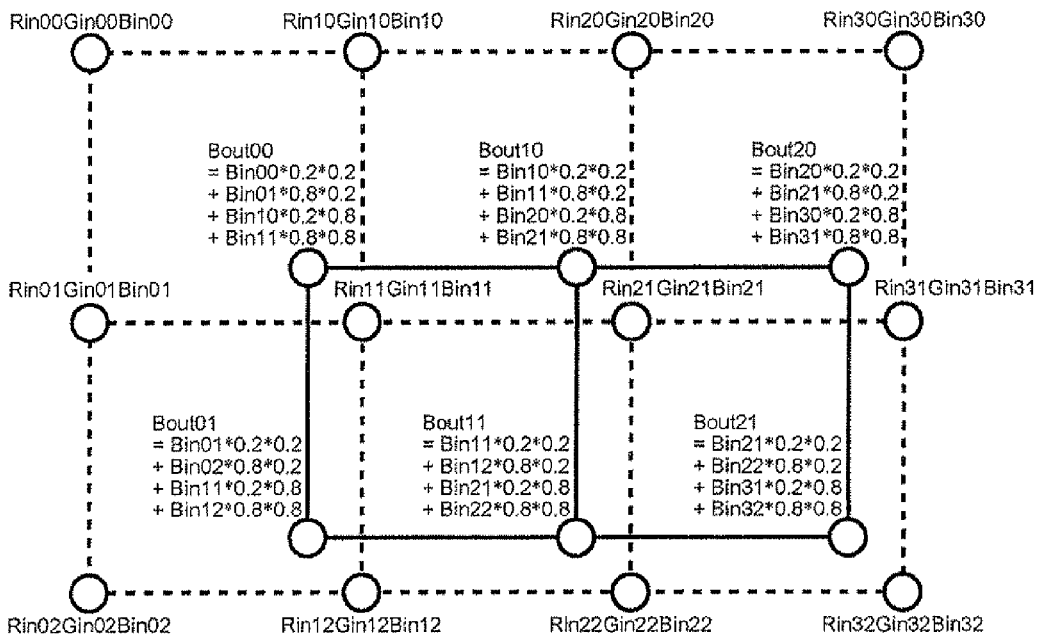
FIG. 21 is a diagram for explaining an example of processing for correcting input image signals of sub-pixels of the B component according to the second embodiment.

FIG. 21 is a diagram for explaining an example of correction processing for input image signals of sub-pixels of the B component according to the second embodiment. In FIG. 21, components same as those shown in FIG. 18 are denoted by the same reference signs and explanation of the components is omitted as appropriate.

In FIG. 21, input image signals of sub-pixels forming each of pixels and display pixels projected on the basis of the input image signals are schematically shown. Input image signals (pixel values) of the sub-pixels of the B component are represented as Bin00, Bin10, Bin20, Bin30, Bin01, Bin11, Bin21, Bin31, Bin02, Bin12, Bin22, and Bin32. The sub-pixels of the B component after the correction processing are represented as Bout00, Bout10, Bout20, Bout01, Bout11, and Bout21.

Shift amounts of the respective sub-pixels may be different for each of the sub-pixels. However, in FIG. 21, it is assumed that shift amounts of the sub-pixels of the B component Bout00, Bout10, Bout20, Bout01, Bout11, and Bout21 are identical and the sub-pixels shift by 0.8 pixel in the horizontal direction and 0.8 pixel in the vertical direction from one another.

In this case, image signals (pixel values) Bout00 and Bout10 of the sub-pixels of the B component are calculated as indicated by the following formula according to, for example, the bi-linear method:

$Bout00 = Bin00 \times 0.2 \times 0.2 + Bin01 \times 0.8 \times 0.2 + Bin10 \times 0.2 \times 0.8 + Bin11 \times 0.8 \times 0.8$ $Bout10 = Bin10 \times 0.2 \times 0.2 + Bin11 \times 0.8 \times 0.2 + Bin20 \times 0.2 \times 0.8 + Bin21 \times 0.8 \times 0.8$ Other image signals (e.g., Bout20 and Bout01) of the sub-pixels of the B component shown in FIG. 21 are calculated in the same manner.

The processing described above is performed in step S44 shown in FIG. 19.

On the other hand, since shift amounts of display positions of the sub-pixels of the R component and the B component are calculated with display positions of the sub-pixels of the G component as reference positions, correction processing for input image signals of the G component is unnecessary.

Figure 22:
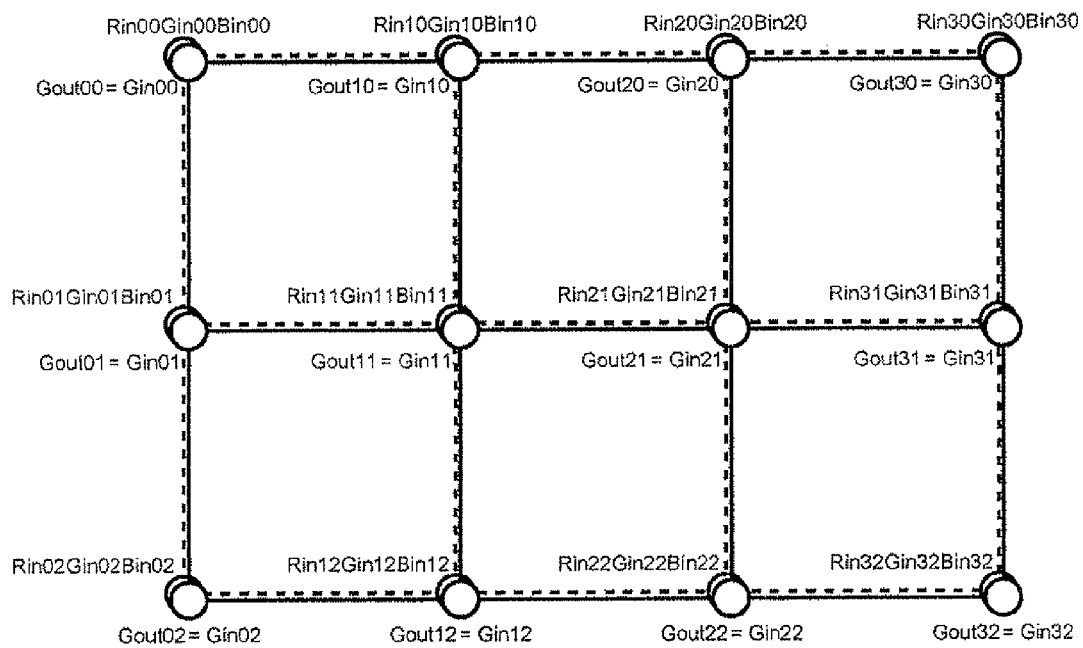
FIG. 22 is a diagram for explaining input image signals of sub-pixels of the G component according to the second embodiment.

FIG. 22 is a diagram for explaining input image signals of the sub-pixels of the G component according to the second embodiment. In FIG. 22, components same as those shown in FIG. 18 are denoted by the same reference signs and explanation of the components is omitted as appropriate.

In FIG. 22, input image signals of sub-pixels forming each of pixels and display pixels projected on the basis of the input image signals are schematically shown. Input image signals (pixel values) of the sub-pixels of the G component are represented as Gin00, Gin10, Gin20, Gin30, Gin01, Gin11, Gin21, Gin31, Gin02, Gin12, Gin22, and Gin32. Output image signals of the sub-pixels of the G component are represented as Gout00, Gout10, Gout20, Gout30, Gout01, Gout11, Gout21, Gout31, Gout02, Gout12, Gout22, and Gout32.

In this case, image signals (pixel values) Gout00 and Gout10 of the sub-pixels of the G component are calculated as indicated by the following formula:

$Gout00 = Gin00$ $Gout10 = Gin10$

Other image signals (e.g., Gout20 and Gout01) of the sub-pixels of the G component shown in FIG. 22 are calculated in the same manner.

As explained above, according to the second embodiment, shift amounts of the display positions of the sub-pixels of the R component and the B component are calculated with the display positions of the sub-pixels of the G component as the reference positions. Therefore, calculation of shift amounts of all the sub-pixels of the G component and correction processing for the input image signals of the G component do not have to be performed. It is possible to prevent deterioration in an image quality due to shifts of display positions of sub-pixels forming one pixel and realize simplification of processing.

First Modification of the Second Embodiment

In the second embodiment, as in the first modification of the first embodiment, it is also possible that, as shown in FIG. 15, a shift-amount storing unit stores plural sets of shift amount groups and correction processing is applied to input image signals by using a shift amount selected out of the shift amount groups.

A configuration of a projector according to a first modification of the second embodiment is the same as the configuration of the projector according to the first modification of the first embodiment. Therefore, detailed explanation of the configuration is omitted.

Figure 23:
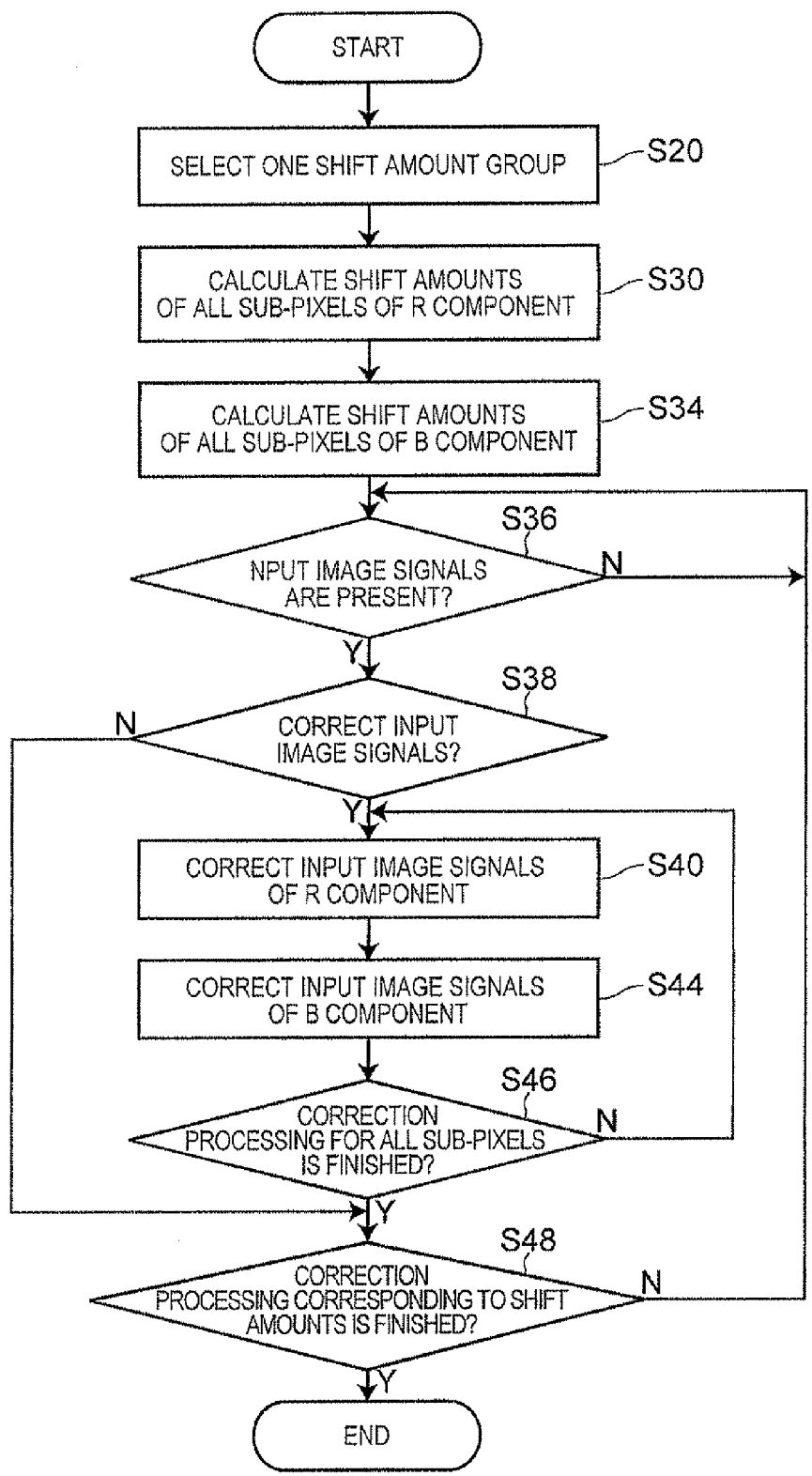
FIG. 23 is a flowchart of an example of correction processing corresponding to shift amounts according to a first modification of the second embodiment.

FIG. 23 is a flowchart of an example of correction processing corresponding to shift amounts according to the first modification of the second embodiment. In FIG. 23, steps same as those shown in FIG. 16 are denoted by the same reference signs and explanation of the steps is omitted as appropriate.

For example, a program for realizing the processing shown in FIG. 23 is stored in the ROM 82 in advance. The CPU 80 reads out the program stored in the ROM 82 and executes processing corresponding to the program. Consequently, the processing shown in FIG. 23 can be realized by software processing.

As shown in FIG. 23, according to the first modification of the second embodiment, compared with the processing shown in FIG. 16, it is possible to omit the processing for calculating shift amounts of all the sub-pixels of the G component and the processing for correcting the input image signals of the G component and substantially simplify the processing.

Second Modification of the Second Embodiment

In the second embodiment, as in the second modification of the first embodiment, shift amounts may be changed in the correction processing for image signals of the sub-pixels in the image.

A configuration of a projector according to the second modification of the second embodiment is the same as the configuration of the projector according to the second modification of the first embodiment. Therefore, detailed explanation of the configuration is omitted.

Figure 24:
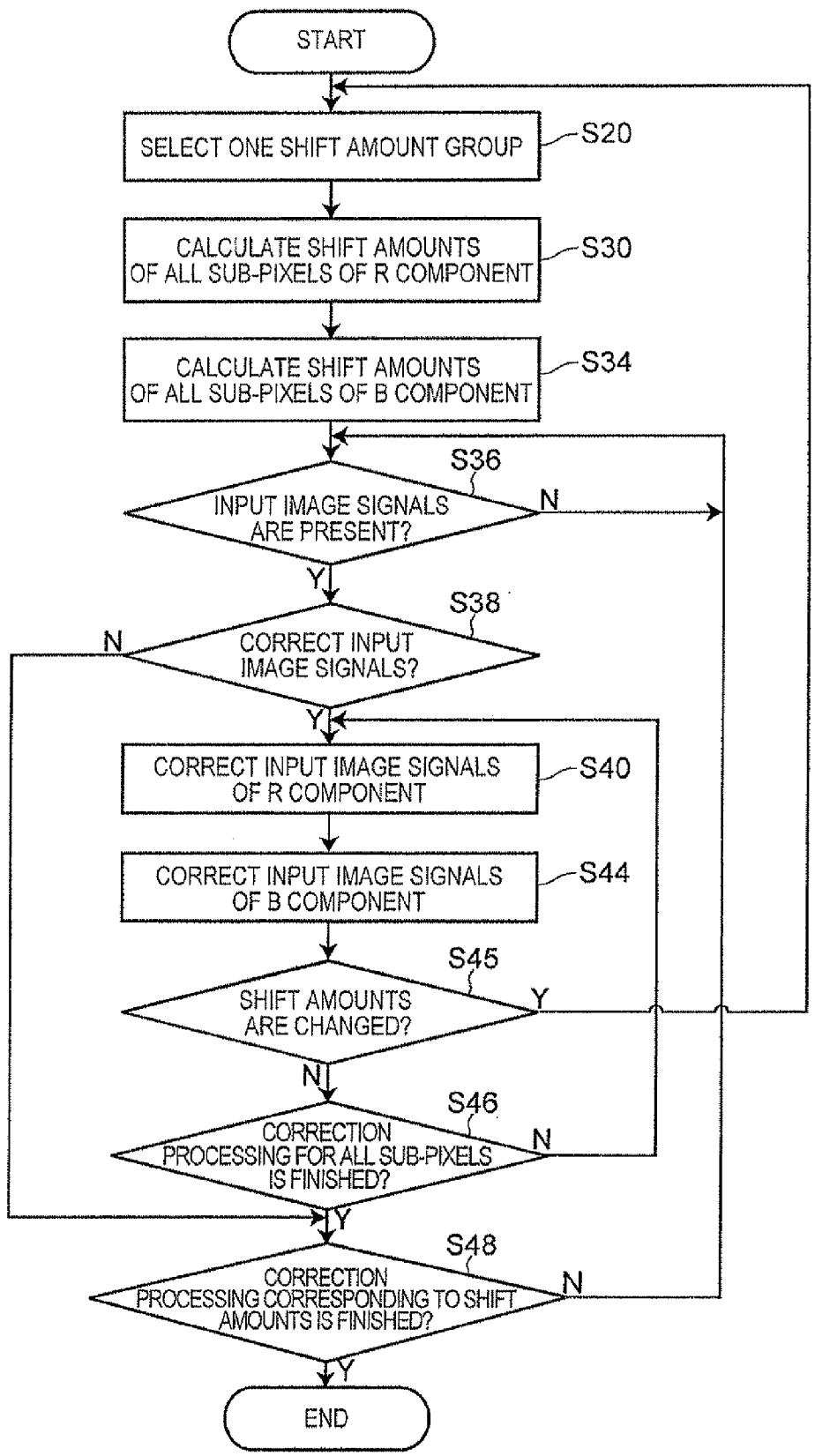
FIG. 24 is a flowchart of an example of correction processing corresponding to shift amounts according to a second modification of the second embodiment.

FIG. 24 is a flowchart of an example of correction processing corresponding to shift amounts according to the second modification of the second embodiment. In FIG. 24, steps same as those shown in FIG. 17 are denoted by the same reference signs and explanation of the steps is omitted as appropriate.

For example, a program for realizing the processing shown in FIG. 24 is stored in the ROM 82 in advance. The CPU 80 reads out the program stored in the ROM 82 and executes processing corresponding to the program. Consequently, the processing shown in FIG. 24 can be realized by software processing.

As shown in FIG. 24, according to the second modification of the second embodiment, compared with the processing shown in FIG. 16, it is possible to omit the processing for calculating shift amounts of all the sub-pixels of the G component and the processing for correcting the input image signals of the G component and substantially simplify the processing.

Third Embodiment

In the first embodiment or the modifications thereof or the second embodiment or the modifications thereof, zoom magnification of the projecting unit 100 is detected by the zoom-state detecting unit 60. The correction processing for input image signals is performed or the correction processing is omitted according to a result of the detection. However, the invention is not limited to this.

Figure 25:
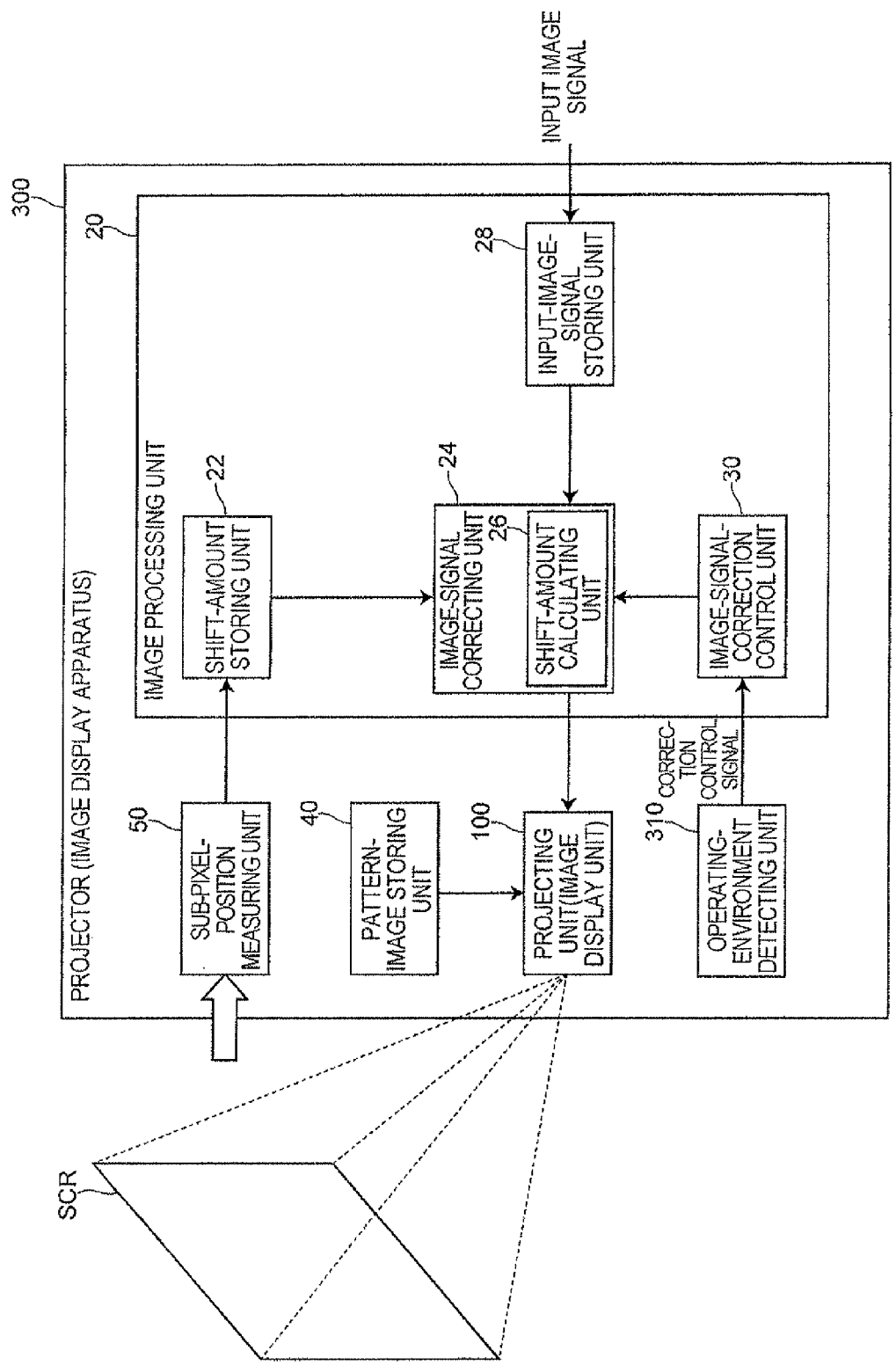
FIG. 25 is a block diagram of a configuration example of a projector according to a third embodiment of the invention.

FIG. 25 is a block diagram of a configuration example of a projector according to a third embodiment of the invention.

Components same as those shown in FIG. 1 are denoted by the same reference numerals and signs and explanation of the components is omitted as appropriate.

A projector 300 according to the third embodiment is different from the projector 10 according to the first embodiment in that an operating-environment detecting unit 310 is provided instead of the zoom-state detecting unit 60. The operating-environment detecting unit 310 generates a correction control signal and outputs the correction control signal to the image-signal-correction control unit 30 of the image processing unit 20.

The operating-environment detecting unit 310 detects an operating environment of the projector 300 and generates a correction control signal corresponding to a result of the detection. As such an operating environment detecting unit 310, a sensor such as a temperature sensor, a humidity sensor, or an optical sensor is adopted. This makes it possible to correct input image signals according to shift amounts of display positions of sub-pixels according to the operating environment of the projector 300 regardless of zoom magnification of the projecting unit 100. Deterioration in an image quality due to shifts of display positions of sub-pixels is considered to be caused by an operating environment (temperature, etc.) of a projector as well. Therefore, in the third embodiment, input image signals are corrected according to an operating environment detected by the operating-environment detecting unit 310.

The image display apparatus and the image display method according to the invention are explained above on the basis of the embodiments and the modifications thereof. However, the invention is not limited to the embodiments. It is possible to carry out the invention in various forms without departing from the spirit of the invention. For example, modifications described below are also possible.

(1) In the explanation of the embodiments and the modifications thereof, one pixel includes sub-pixels of three color components. However, the invention is not limited to this. The number of color components forming one pixel may be two or four or more.

(2) In the explanation of the embodiments and the modifications thereof, the light valve is used as the light modulating unit. However, the invention is not limited to this. For example, DLP (Digital Light Processing) (registered trademark) or LCOS (Liquid Crystal On Silicon) may be adopted as the light modulating unit.

(3) In the explanation of the embodiments and the modifications thereof, the light valve employing a so-called 3CCD transmissive liquid crystal panel is explained as an example of the light modulating unit. However, a light valve employing a 4CCD transmissive liquid crystal panel or a transmissive liquid crystal panel including more than four plates may be adopted.

(4) In the explanation of the embodiments and the modifications thereof, the nearest neighbor method, the bi-linear method, and the bi-cubit method are described as examples of the interpolation processing method for shift amounts of all sub-pixels and the correction processing method for image signals. However, the invention is not limited to these processing methods.

(5) In the explanation of the embodiments and the modifications thereof, the correction processing method for input image signals by the image-signal correcting unit 24 is varied according to a correction control signal and the correction processing itself is performed or omitted. However, the invention is not limited to this. In the image-signal correcting unit 24, a first correction processing method such as the nearest neighbor method and a second correction processing method such as the bi-linear method may be changed according to the correction control signal to correct input image signals.

(6) In the embodiments, the invention is explained as the image display apparatus and the image display method. However, the invention is not limited to this. For example, the invention may be a program in which a processing procedure of an image display method for realizing the invention is described or a recording medium in which the program is recorded.

What is claimed is:

1. A projector comprising:
   a projecting unit configured to project a first image of a first color and a second image of a second color;
   a storing unit configured to store first information indicating displacement of the second image relative to the first image at a first position, and second information indicating displacement of the second image relative to the first image at a second position; and
   an image-signal correcting unit configured to correct image signals of the second image according to the first information and the second information to reduce the displacement of the second image, wherein
      the projecting unit projects a third image of a third color,
      the storing unit stores information indicating displacement of the third image relative to the first image, and
      the image-signal correcting unit corrects image signals of the third image according to the information indicating displacement of the third image to reduce the displacement of the third image.

2. The projector of claim 1, wherein the image-signal correcting unit corrects the image signals of the second image by interpolation processing.

3. The projector of claim 1, further comprising a zoom-state detecting unit that detects a zoom state of the images displayed by the projecting unit.

4. The projector of claim 1, wherein, for a given pixel, the storing unit stores a first displacement amount for a sub-pixel of the third color, and stores a second displacement amount for a sub-pixel of a fourth color.

5. The projector of claim 1, wherein the second image displayed by the projecting unit is also displayed on the basis of input image signals corrected by the image-signal correcting unit, the image-signal correcting unit using same displacement amounts used in a display of the first image.

6. The projector of claim 1, wherein
   the information indicating displacement of the third image relative to the first image includes third information indicating displacement of the third image relative to the first image at the first position, and fourth information including displacement of the third image relative to the first image at the second position, and
   the image-signal correcting unit configured to correct image signals of the third image according to the third information and the fourth information to reduce displacement of the third image.

* * * * *